United States Patent
Aoi et al.

(10) Patent No.: US 10,401,593 B2
(45) Date of Patent: Sep. 3, 2019

(54) IMAGING LENS AND IMAGING APPARATUS

(71) Applicant: FUJIFILM Corporation, Tokyo (JP)

(72) Inventors: Toshihiro Aoi, Saitama (JP); Takashi Kunugise, Saitama (JP); Kazuyoshi Okada, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 181 days.

(21) Appl. No.: 15/412,766

(22) Filed: Jan. 23, 2017

(65) Prior Publication Data
US 2017/0242222 A1 Aug. 24, 2017

(30) Foreign Application Priority Data

Feb. 19, 2016 (JP) .................................. 2016-029599

(51) Int. Cl.
| | |
|---|---|
| *G02B 13/00* | (2006.01) |
| *G02B 7/04* | (2006.01) |
| *G02B 9/64* | (2006.01) |
| *G02B 13/04* | (2006.01) |

(52) U.S. Cl.
CPC ........... *G02B 13/0045* (2013.01); *G02B 7/04* (2013.01); *G02B 9/64* (2013.01); *G02B 13/04* (2013.01)

(58) Field of Classification Search
CPC ...... G02B 15/14; G02B 15/16; G02B 15/161; G02B 15/167; G02B 15/17; G02B 15/173; G02B 15/177; G02B 15/24; G02B 15/22; G02B 15/08
See application file for complete search history.

(56) References Cited

U.S. PATENT DOCUMENTS

| | | | |
|---|---|---|---|
| 6,229,655 B1* | 5/2001 | Kohno | G02B 15/177 359/680 |
| 6,894,847 B2 | 5/2005 | Suzuki | |
| 7,212,242 B2* | 5/2007 | Watanabe | G02B 15/177 348/240.3 |
| 8,593,740 B2 | 11/2013 | Suzuki | |
| 2009/0034089 A1* | 2/2009 | Kawada | G02B 15/173 359/684 |

FOREIGN PATENT DOCUMENTS

| | | |
|---|---|---|
| JP | 2004-219610 A | 8/2004 |
| JP | 2012-063380 A | 3/2012 |

* cited by examiner

*Primary Examiner* — Joseph P Martinez
(74) *Attorney, Agent, or Firm* — Studebaker & Brackett PC

(57) ABSTRACT

The imaging lens includes, in order from the object side, a first lens group that remains stationary during focusing; a diaphragm; and a positive second lens group that moves to the object side during focusing from a long range to a close range. The second lens group includes a positive Z lens that is formed continuously in order from a most image side, a negative Y lens that has an absolute value of a radius of curvature of an object side surface smaller than an absolute value of a radius of curvature of an image side surface, a positive X lens, and a negative W lens that has an absolute value of a radius of curvature of an image side surface smaller than that of an object side surface. The imaging lens satisfies a conditional expression about of the radii of curvature of the X lens and the W lens.

19 Claims, 16 Drawing Sheets

EXAMPLE 1

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 2

EXAMPLE 4

EXAMPLE 5

EXAMPLE 6

EXAMPLE 8

EXAMPLE 9

IMAGING LENS AND IMAGING APPARATUS

CROSS-REFERENCE TO RELATED APPLICATIONS

The present application claims priority under 35 U.S.C. § 119 to Japanese Patent Application No. 2016-029599, filed Feb. 19, 2016, all of which are hereby expressly incorporated by reference into the present application.

BACKGROUND OF THE INVENTION

1. Field of the Invention

The present invention relates to an imaging lens and an imaging apparatus. In particular, the present invention relates to a single focus imaging lens, which is appropriate for a factory automation (FA) camera, a machine vision camera, a surveillance camera, a digital camera, a cinema camera, and/or the like, and an imaging apparatus comprising the imaging lens.

2. Description of the Related Art

As single focus imaging lenses, for example, lens systems described in the following JP2012-63380A and JP2004-219610A have been known. JP2012-63380A discloses a lens system including, in order from the object side: a first lens group that has a negative refractive power; a second lens group that has a positive refractive power; a diaphragm; and a third lens group that has a positive refractive power. JP2004-219610A discloses a lens system including, in order from the object side: a first lens group that has a negative refractive power; a diaphragm; and a second lens group that has a positive refractive power. The lens system performs focusing by moving only a part of the second lens group.

SUMMARY OF THE INVENTION

Recently, machine vision cameras, which capture an image of an object through an imaging lens and automatically perform detection and the like, have come into widespread use. Since there are various shapes of an object as an imaging target and various distances from the imaging lens to the object, accuracy is necessary for detection. Hence, it is preferable that the used imaging lens has a focusing function and has small fluctuation in aberrations caused by focusing, particularly, fluctuation in spherical aberration and astigmatism. For the imaging lens used in the camera of the above-mentioned field such as the machine vision camera, a small F number is necessary. In recent years, there has been an increase in demand for an imaging lens that has an F number smaller than the F numbers of the lens systems proposed in JP2012-63380A and JP2004-219610A.

The present invention has been made in consideration of the above-mentioned situation, and its object is to provide an imaging lens that has a small F number, has small fluctuation in aberrations caused by focusing, and has a favorable optical performance, and an imaging apparatus having the imaging lens.

Provided is an imaging lens of the present invention consisting of, in order from an object side: a first lens group that remains stationary with respect to an image plane during focusing; a diaphragm; and a second lens group that moves from an image side to the object side during focusing from a long distance object to a close-range object and has a positive refractive power as a whole. The second lens group includes a Z lens that is a positive lens formed continuously in order from a most image side, a Y lens that is a negative lens having an absolute value of a radius of curvature of an object side surface smaller than an absolute value of a radius of curvature of an image side surface, an X lens that is a positive lens, and a W lens that is a negative lens having an absolute value of a radius of curvature of an image side surface smaller than an absolute value of a radius of curvature of an object side surface. The following conditional expression (1) is satisfied.

$$0.1<(RXf-RWr)/(RXf+RWr)<3 \quad (1)$$

Here, RXf is a radius of curvature of an object side surface of the X lens, and
RWr is the radius of curvature of the image side surface of the W lens.

It is preferable that the imaging lens of the present invention satisfies at least one of the following conditional expressions (2) to (8) and (1-1) to (7-1).

$$0.01<dWX/f2<0.2 \quad (2)$$
$$2.5<vZ-vY<40 \quad (3)$$
$$0.5<f2/RWr<4 \quad (4)$$
$$-4<f2/RYf<-1 \quad (5)$$
$$0.4<f/f2<1 \quad (6)$$
$$-0.55<f2/f1<0.5 \quad (7)$$
$$-3<RWr/RYf<-0.5 \quad (8)$$
$$0.2<(RXf-RWr)/(RXf+RWr)<1.8 \quad (1-1)$$
$$0.03<dWX/f2<0.15 \quad (2-1)$$
$$3<vZ-vY<35 \quad (3-1)$$
$$0.8<f2/RWr<3 \quad (4-1)$$
$$-3.5<f2/RYf<-1.5 \quad (5-1)$$
$$0.45<f/f2<0.8 \quad (6-1)$$
$$-0.5<f2/f1<0.4 \quad (7-1)$$

Here, dWX is an on-axis spacing between the image side surface of the W lens and the object side surface of the X lens,
f2 is a focal length of the second lens group,
vZ is an Abbe number of the Z lens based on a d-line,
vY is an Abbe number of the Y lens based on a d-line,
RWr is the radius of curvature of the image side surface of the W lens,
RYf is the radius of curvature of the object side surface of the Y lens,
f is a focal length of a whole system in a state where an infinite distance object is in focus,
f1 is a focal length of the first lens group, and
RXf is a radius of curvature of an object side surface of the X lens.

In the imaging lens of the present invention, the second lens group may consist of in order from the object side, a lens component that has a positive refractive power, the W lens, the X lens, the Y lens, and the Z lens. Then, with such a configuration, it is preferable that the imaging lens satisfies the following conditional expression (9).

$$0.75<f2/f21<2 \quad (9)$$

Here, f2 is a focal length of the second lens group, and f21 is a focal length of the lens component having the positive refractive power in the second lens group.

In the imaging lens of the present invention, the first lens group may consist of four lenses that include at least two negative lenses. For example, the first lens group may consist of, in order from the object side, a negative lens, a negative lens, a positive lens, and a negative lens.

An imaging apparatus of the present invention comprises the imaging lens of the present invention.

It should be noted that the term "includes, substantially ~" means that the imaging lens may include not only the above-mentioned elements but also lenses substantially having no powers, optical elements, which are not lenses, such as a diaphragm and/or a cover glass, and mechanism parts such as a lens flange, a lens barrel, and/or a hand shaking correction mechanism.

In addition, reference signs of refractive powers of the lens groups, reference signs of refractive powers of the lenses, surface shapes of the lenses, and radii of curvature of the surfaces of the lenses are assumed as those in paraxial regions in a case where some lenses have aspheric surfaces. Reference signs of radii of curvature of surface shapes convex toward the object side are set to be positive, and reference signs of radii of curvature of surface shapes convex toward the image side are set to be negative. The "lens component" means a lens of which air contact surfaces are two surfaces including an object side surface and an image side surface on the optical axis, and one lens component means one single lens or a group of cemented lenses. Further, unless otherwise noted, the above conditional expressions are based on the d-line (a wavelength of 587.6 nm).

According to the present invention, the lens system includes, in order from the object side, the first lens group that remains stationary during focusing; the diaphragm; and the positive second lens group that moves to the object side during focusing from the long distance object to the close-range object. In the lens system, the specific configuration of the second lens group is set so as to satisfy a predetermined conditional expression. Thus, it is possible to provide an imaging lens that has a small F number, has small fluctuation in aberrations caused by focusing, and has a favorable optical performance, and an imaging apparatus comprising the imaging lens.

DESCRIPTION OF THE PREFERRED EMBODIMENTS

Figure 1:
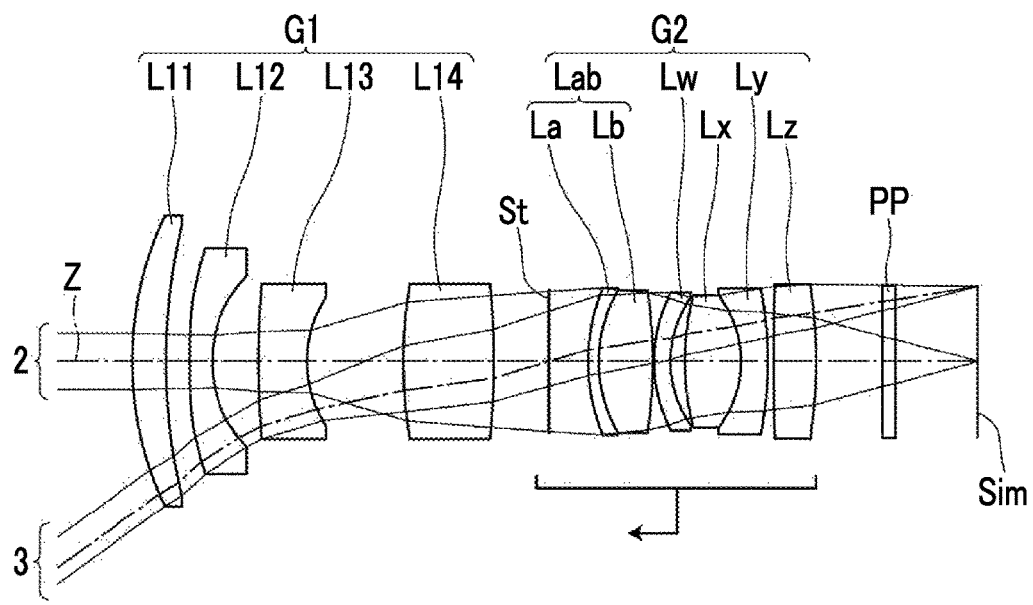
FIG. 1 is a cross-sectional view illustrating a configuration and an optical path of an imaging lens of Example 1 of the present invention.

Hereinafter, embodiments of the present invention will be described with reference to drawings. FIGS. 1 to 10 are cross-sectional views illustrating configurations and optical paths of imaging lenses according to an embodiment of the present invention, and respectively correspond to Examples 1 to 10 to be described later. Basic configurations and methods shown in the drawings of examples shown in FIGS. 1 to 10 are the same, and will be hereinafter described with reference to mainly the example shown in FIG. 1. FIG. 1 shows the state where the infinite distance object is in focus, and shows optical paths of on-axis rays 2 and off-axis rays 3 with the maximum angle of view, where the left side is the object side thereof, and the right side thereof is the image side.

The imaging lens is a single focus lens, and consists of, in order from the object side to the image side along an optical axis Z: a first lens group G1 that remains stationary with respect to the image plane Sim during focusing; an aperture diaphragm St; and a second lens group G2 that moves from the image side to the object side during focusing from a long distance object to a close-range object and has a positive refractive power as a whole. Such a configuration is advantageous in suppressing fluctuation in spherical aberration and fluctuation in astigmatism during focusing. In addition, an arrow below the second lens group G2 of FIG. 1 indicates a direction of movement during focusing.

In order to apply the imaging lens to an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The first lens group G1 in the example shown in FIG. 1 includes, in order from the object side, four lenses L11 to L14. The first lens group G1 may consist of four lenses that include at least two negative lenses. In this case, by forming two or more negative lenses, it is possible to suppress occurrence of distortion while ensuring a back focal length thereof. Further, by setting the number of lenses constituting the first lens group G1 to four, a diameter of a lens closest to the object side is minimized, and thus this configuration is advantageous in reduction in size.

The first lens group G1 may consist of, in order from the object side, a negative lens, a negative lens, a positive lens, and a negative lens. With such a configuration, it is possible to suppress occurrence of distortion while ensuring the back focal length through the first and second negative lenses from the object side, and it is possible to correct distortion, which are caused by the two negative lenses, through the positive lens. Further, it is possible to satisfactorily correct a chromatic aberration by balancing longitudinal chromatic aberration and lateral chromatic aberration through an effect of the positive lens and the negative lens closest to the image side.

Further, in a case where the first lens group G1 includes four lenses having negative, negative, positive, and negative refractive powers in order from the object side as described above, the negative lens closest to the object side may be a negative meniscus lens having an absolute value of a radius of curvature of an image side surface smaller than an absolute value of a radius of curvature of an object side surface. In such a case, this configuration is advantageous in correcting distortion. For example, the first lens group G1 may include, in order from the object side: a negative meniscus lens that is concave toward the image side; a negative lens that is concave toward the image side; a biconvex lens; and a negative lens that is concave toward the object side. Then, in such a case, a lens closest to the image side in the first lens group G1 and a second lens from the image side may be bonded and formed as a cemented lens.

Alternatively, the first lens group G1 may consist of, in order from the object side, a positive lens, a negative lens, a negative lens, and a positive lens. With such a configuration, it is possible to correct distortion and lateral chromatic aberration, which are caused by the negative lens, through an effect of the positive lens closest to the object side while ensuring the back focal length. Thus, this configuration is advantageous in an increase in angle of view. For example, the first lens group G1 may include, in order from the object side, a positive meniscus lens that is convex toward the object side, a negative meniscus lens that is concave toward the image side, a negative lens that is concave toward the image side, and a biconvex lens.

The second lens group G2 includes four or more lenses. Hereinafter, first, second, third, and fourth lenses from the image side in the second lens group G2 are respectively referred to as a Z lens Lz, a Y lens Ly, an X lens Lx, and a W lens Lw. The second lens group G2 includes a Z lens Lz that is a positive lens formed continuously in order from the most image side toward the object side, a Y lens Ly that is a negative lens having an absolute value of a radius of curvature of an object side surface smaller than an absolute value of a radius of curvature of an image side surface, an X lens Lx that is a positive lens, and a W lens Lw that is a negative lens having an absolute value of a radius of curvature of an image side surface smaller than an absolute value of a radius of curvature of an object side surface.

The Y lens Ly, which is a negative lens, is configured to have an absolute value of a radius of curvature of an object side surface smaller than an absolute value of a radius of curvature of an image side surface, and thereby the object side surface of the Y lens Ly is formed as a concave surface. Likewise, the image side surface of the W lens Lw, which is a negative lens, is also formed as a concave surface. The negative refractive power is shared by the image side surface of the W lens Lw, which is a negative lens, and the object side surface of the Y lens Ly. Thereby, by appropriately correcting spherical aberration of the second lens group G2 which is a focusing group, it is possible to suppress fluctuation in spherical aberration during focusing. By forming the object side surface of the Y lens Ly, which is a negative lens with a high ray height of the off-axis principal ray, as a concave surface, it is possible to suppress fluctuation in astigmatism during focusing. Further, negative and positive lenses are alternately arranged continuously in order from the most image side of the second lens group G2. Thereby, it is possible to suppress occurrence of off-axis high-order aberrations, particularly, high-order astigmatism, high-order distortion, and high-order lateral chromatic aberration. Then, a positive lens is disposed on the most image side, and thereby it is possible to minimize an angle of the principal ray with a peripheral angle of view incident onto the image plane Sim.

It is preferable that the second lens group G2 consists of, in order from the object side: a lens component that has a positive refractive power; the W lens Lw; the X lens Lx; the Y lens Ly; and the Z lens Lz. The term "the lens component having a positive refractive power" described herein means one single lens having a positive refractive power, or a group of cemented lenses that have a positive refractive power as a whole. In such a case, positive and negative powers are alternately set in the second lens group G2. Thereby, it is possible to prevent a ray height of the on-axis marginal ray from excessively increasing. As a result, it is possible to suppress occurrence of high-order spherical aberration. In a case where a cemented lens is disposed on the most object side of the second lens group G2, this configuration is advantageous in correcting longitudinal chromatic aberration.

For example, in the example shown in FIG. 1, the second lens group G2 includes, in order from the object side, a cemented lens Lab, the W lens Lw, the X lens Lx, the Y lens Ly, and the Z lens Lz. The cemented lens Lab is formed by bonding a lens La, which is a negative meniscus lens that is concave toward the image side, and a lens Lb, which is a biconvex lens, in order from the object side, and has thus a positive refractive power as a whole. In the example shown in FIG. 1, the cemented lens Lab corresponds to the lens component that has a positive refractive power.

Figure 2:
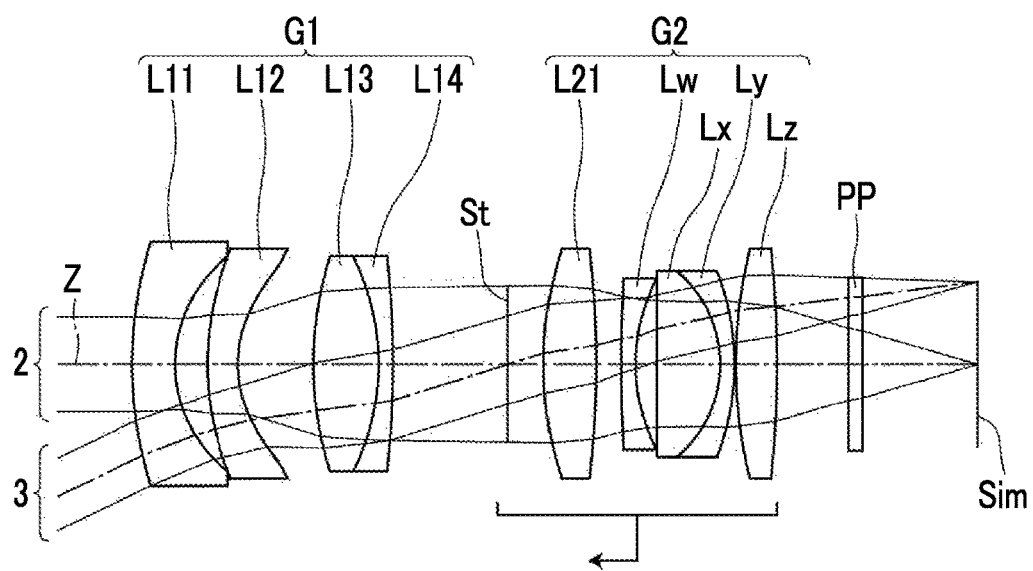
FIG. 2 is a cross-sectional view illustrating a configuration and an optical path of an imaging lens of Example 2 of the present invention.

Meanwhile, in the example shown in FIG. 2, the second lens group G2 includes, in order from the object side, a lens L21 that is a single lens having a positive refractive power, the W lens Lw, the X lens Lx, the Y lens Ly, and the Z lens Lz. In the example shown in FIG. 2, the lens L21 corresponds to the lens component that has a positive refractive power.

As shown in examples of FIGS. 1 and 2, the Y lens Ly can be formed as a negative meniscus lens. The X lens Lx and the Y lens Ly may be bonded to each other. In such a case, it is possible to reduce the absolute value of the radius of curvature of the bonded surface while suppressing occurrence of high-order spherical aberration. As a result, this configuration is advantageous in correcting chromatic aberration. Further, the Z lens Lz can be formed to have a shape that is convex toward the object side.

The imaging lens of the present embodiment is configured to satisfy the following conditional expression (1).

$$0.1 < (RXf - RWr)/(RXf + RWr) < 3 \tag{1}$$

Here, RXf is a radius of curvature of the object side surface of the X lens, and RWr is a radius of curvature of the image side surface of the W lens.

The conditional expression (1) is an expression about a shape of an air lens which is formed between the W lens Lw and the X lens Lx. Here, changes in the ray height when rays pass through the air lens, that is, differences between ray heights of the rays at the object side surface of the air lens and ray heights thereof at the image side surface are considered. By not allowing the result of the conditional expression (1) to be equal to or less than the lower limit, it is possible to provide a sufficient negative refractive power to the air lens. Thereby, rays, which pass through a part of the air lens far from the optical axis Z, can be made to have smaller changes in ray height when passing through the air lens than rays which pass through a part thereof in the vicinity of the optical axis Z. In particular, in a case where both the object side surface of the X lens Lx and the image side surface of the W lens Lw are spherical surfaces, by not allowing the result of the conditional expression (1) to be equal to or less than the lower limit, among the rays passing through the air lens, rays farther from the optical axis Z can be made to have smaller changes in ray height when passing through the air lens. Further, even in case where at least one of the object side surface of the X lens Lx and the image side surface of the W lens Lw is an aspheric surface, it is possible to obtain the same effect mentioned above as long as a shape of the aspheric surface has no inflection point within an effective diameter. Due to the above-mentioned effect, it is possible to prevent high-order aberrations, particularly, high-order spherical aberration and high-order astigmatism from being excessively corrected while suppressing fluctuation in low-order spherical aberration and fluctuation in low-order astigmatism during focusing. As a result, this configuration is advantageous in achieving a lens system having a small F number. Further, by not allowing the result of the conditional expression (1) to be equal to or greater than the upper limit, it is possible to suppress fluctuation in low-order spherical aberration and fluctuation in low-order astigmatism during focusing. In order to enhance the effect relating to the conditional expression (1), it is preferable that the following conditional expression (1-1) is satisfied.

$$0.2 < (RXf - RWr)/(RXf + RWr) < 1.8 \tag{1-1}$$

It is preferable that the imaging lens satisfies at least one or an arbitrary combination of the following conditional expressions (2) to (8).

$$0.01 < dWX/f2 < 0.2 \tag{2}$$

$$2.5 < \nu Z - \nu Y < 40 \tag{3}$$

$$0.5 < f2/RWr < 4 \tag{4}$$

$$-4 < f2/RYf < -1 \tag{5}$$

$$0.4 < f/f2 < 1 \tag{6}$$

$$-0.55 < f2/f1 < 0.5 \tag{7}$$

$$-3 < RWr/RYf < -0.5 \tag{8}$$

Here, dWX is an on-axis spacing between the image side surface of the W lens and the object side surface of the X lens, f2 is a focal length of the second lens group, νZ is an Abbe number of the Z lens based on a d-line, νY is an Abbe number of the Y lens based on a d-line, RWr is the radius of curvature of the image side surface of the W lens, RYf is the radius of curvature of the object side surface of the Y lens, f is a focal length of a whole system in a state where the infinite distance object is in focus, and f1 is a focal length of the first lens group.

dWX of the conditional expression (2) corresponds to a center thickness of the air lens. By not allowing the result of the conditional expression (2) to be equal to or less than the lower limit, it is possible to enhance the effect relating to the lower limit of the above-mentioned conditional expression (1). In addition, if the spacing between surfaces forming the air lens excessively increases, the effect of the air lens becomes weak. Thus, by not allowing the result of the conditional expression (2) to be equal to or greater than the upper limit, it is possible to ensure the effect of the air lens, and it is possible to suppress fluctuation in astigmatism during focusing. In order to enhance the effect relating to the conditional expression (2), it is preferable that the following conditional expression (2-1) is satisfied.

$$0.03 < dWX/f2 < 0.15 \tag{2-1}$$

By selecting a material of the lens such that the conditional expression (3) is satisfied, it is possible to suppress lateral chromatic aberration in an appropriate range. In order to enhance the effect relating to the conditional expression (3), it is preferable that the following conditional expression (3-1) is satisfied.

$$3 < \nu Z - \nu Y < 35 \tag{3-1}$$

By not allowing the result of the conditional expression (4) to be equal to or less than the lower limit, it is possible to suppress fluctuation in spherical aberration during focusing. By not allowing the result of the conditional expression (4) to be equal to or greater than the upper limit, it is possible to suppress fluctuation in astigmatism during focusing. In order to enhance the effect relating to the conditional expression (4), it is preferable that the following conditional expression (4-1) is satisfied.

$$0.8 < f2/RWr < 3 \tag{4-1}$$

By not allowing the result of the conditional expression (5) to be equal to or less than the lower limit, it is possible to prevent high-order spherical aberration, which is excessively corrected, from occurring. By not allowing the result of the conditional expression (5) to be equal to or greater than the upper limit, it is possible to suppress fluctuation in spherical aberration during focusing. In order to enhance the effect relating to the conditional expression (5), it is preferable that the following conditional expression (5-1) is satisfied.

$$-3.5 < f2/RYf < -1.5 \tag{5-1}$$

By not allowing the result of the conditional expression (6) to be equal to or less than the lower limit, it is possible to suppress an amount of movement of the second lens group G2 during focusing. By not allowing the result of the conditional expression (6) to be equal to or greater than the upper limit, it is possible to suppress fluctuation in spherical aberration during focusing. In order to enhance the effect relating to the conditional expression (6), it is preferable that the following conditional expression (6-1) is satisfied.

$$0.45 < f/f2 < 0.8 \tag{6-1}$$

By not allowing the result of the conditional expression (7) to be equal to or less than the lower limit, it is possible to suppress an amount of movement of the second lens group G2 during focusing. By not allowing the result of the conditional expression (7) to be equal to or greater than the upper limit, it is possible to suppress fluctuation in spherical aberration during focusing. In order to enhance the effect relating to the conditional expression (7), it is preferable that the following conditional expression (7-1) is satisfied.

$$-0.5 < f2/f1 < 0.4 \tag{7-1}$$

By selecting a shape of a concave surface belonging to two negative lenses within the second lens group G2 such that the conditional expression (8) is satisfied, it is possible to correct spherical aberration and astigmatism with good balance. In order to enhance the effect relating to the conditional expression (8), it is preferable that the following conditional expression (8-1) is satisfied.

$$-2.5 < RWr/RYf < -0.8 \tag{8-1}$$

Further, the second lens group G2 consists of, in order from the object side: a lens component that has a positive refractive power; the W lens Lw; the X lens Lx; the Y lens Ly; and the Z lens Lz. In this case, it is preferable that the following conditional expression (9) is satisfied.

$$0.75 < f2/f21 < 2 \tag{9}$$

Here, f2 is a focal length of the second lens group, and f21 is a focal length of the lens component having the positive refractive power in the second lens group.

By not allowing the result of the conditional expression (9) to be equal to or less than the lower limit, a positive refractive power of the second lens group G2 is appropriately shared by the elements in the group. As a result, it is possible to suppress fluctuation in spherical aberration during focusing. By not allowing the result of the conditional expression (9) to be equal to or greater than the upper limit, it is possible to suppress occurrence of high-order spherical aberration. In order to enhance the effect relating to the conditional expression (9), it is preferable that the following conditional expression (9-1) is satisfied.

$$0.8 < f2/f21 < 1.8 \tag{9-1}$$

In the imaging lens, it is preferable that the aperture diaphragm St and the second lens group G2 integrally move during focusing. In such a case, it is possible to reduce fluctuation in off-axis aberrations during focusing.

At least one lens constituting the imaging lens may be made of a plastic material. In such a case, it is possible to reduce a weight and costs of the lens system.

In the above description of aberrations, the term "low-order" means the 3rd order, and the term "high-order" means an order equal to or higher than 5th order. Further, in the above description, the "ray height" means a height of rays from the optical axis Z.

The above-mentioned preferred configurations and/or available configurations may be arbitrary combinations, and it is preferable to selectively adopt the configurations in accordance with required specification. According to the present embodiment, it is possible to realize an imaging lens that has a small F number, has small fluctuation in aberrations caused by focusing, and has a favorable optical performance. It should be noted that the term "small F number" described herein means an F number less than 3.

Next, numerical examples of the imaging lens of the present invention will be described.

Example 1

A lens configuration of an imaging lens of Example 1 is shown in FIG. 1, and a configuration and a method thereof shown in the drawing is as described above. Therefore, repeated description is partially omitted herein. The imaging lens of Example 1 includes, in order from the object side: the first lens group G1 that has a negative refractive power; the aperture diaphragm St; and the second lens group G2 that has a positive refractive power. During focusing from an infinite distance object to a close-range object, the first lens group G1 remains stationary with respect to the image plane Sim, and the second lens group G2 and the aperture diaphragm St integrally move from the image side to the object side. It should be noted that the configuration using two groups and the behavior thereof during focusing are the same as those of the imaging lenses of examples to be described later.

The first lens group G1 includes, in order from the object side, the four lenses L11 to L14, and the second lens group G2 includes, in order from the object side, six lenses including the lens La, the lens Lb, the W lens Lw, the X lens Lx, the Y lens Ly, and the Z lens Lz. The lens La and the lens Lb are bonded, thereby constituting the cemented lens Lab that has a positive refractive power as a whole.

Table 1 shows basic lens data of the imaging lens of Example 1, Table 2 shows specification and variable surface spacings, and Table 3 shows aspheric coefficients thereof. In Table 1, the column of Si shows i-th (i=1, 2, 3, . . . ) surface number. The i-th surface number is attached to each of surfaces of the elements, where i sequentially increases toward the image side when a surface of an element closest to the object side is regarded as a first surface. The column of Ri shows a radius of curvature of the i-th surface. The column of Di shows a surface spacing on the optical axis Z between the i-th surface and an i+1 surface. In Table 1, the column of Ndj shows a refractive index of a j-th (j=1, 2, 3, . . . ) component at the d-line (a wavelength of 587.6 nm, where nm represents nanometer), where j sequentially increases toward the image side when the surface of the element closest to the object side is regarded as the first surface. The column of νdj shows an Abbe number of the j-th component on the basis of the d-line. The column of θgFj shows a partial dispersion ratio between the g-line (a wavelength of 435.8 nm) and the F-line (a wavelength of 486.1 nm) of the j-th component.

Here, reference signs of radii of curvature of surface shapes convex toward the object side are set to be positive, and reference signs of radii of curvature of surface shapes convex toward the image side are set to be negative. Table 1 additionally shows the aperture diaphragm St and the optical member PP. In Table 1, in a place of a surface number of a surface corresponding to the aperture diaphragm St, the surface number and a term of (St) are noted. A value at the bottom place of Di indicates a spacing between the image plane Sim and the surface closest to the image side in the table. In Table 1, the variable surface spacings, which are variable during focusing, are referenced by the reference signs DD[ ], and are written into places of Di, where object side surface numbers of spacings are noted in [ ].

Table 2 shows values of the focal length f' of the whole system, the F number FNo., the maximum total angle of view 2ω, and the variable surface spacing, on the basis of d-line. (o) in the place of 2ω indicates that the unit thereof is a degree. In Table 2, the column denoted by the infinite distance shows respective values thereof in a state where the infinite distance object is in focus, and the column denoted by 100 mm shows respective values thereof in a state where an object at an object distance of 100 mm is in focus.

In Table 1, the reference sign * is attached to surface numbers of aspheric surfaces, and numerical values of the paraxial radius of curvature are written into the column of the radius of curvature of each aspheric surface. Table 3 shows aspheric coefficients of the aspheric surfaces of Example 1. The "E-n" (n: an integer) in numerical values of the aspheric coefficients of Table 3 indicates "×10$^{-n}$". The aspheric coefficients are values of the coefficients KA and Am (m=3, 4, 5, . . . 20) in aspheric surface expression represented as the following expression.

$$Zd = \frac{C \times h^2}{1 \times \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial radius of curvature, and KA and Am are aspheric coefficients.

In data of each table, a degree is used as a unit of an angle, and mm is used as a unit of a length, but appropriate different units may be used since the optical system can be used even in a case where the system is enlarged or reduced in proportion. Further, the following each table describes numerical values rounded off to predetermined decimal places.

TABLE 1

Example 1

| Si | Ri | Di | Ndj | νdj | θgFj |
|---|---|---|---|---|---|
| 1 | 25.85519 | 2.586 | 1.48749 | 70.24 | 0.53007 |
| 2 | 44.67362 | 1.827 | | | |
| *3 | 313.04784 | 1.747 | 1.58313 | 59.38 | 0.54237 |
| *4 | 12.10883 | 3.550 | | | |
| 5 | 74.54347 | 3.707 | 1.78590 | 44.20 | 0.56317 |
| 6 | 9.21959 | 7.355 | | | |
| 7 | 34.78722 | 6.930 | 1.95375 | 32.32 | 0.59015 |
| 8 | -60.01480 | DD[8] | | | |
| 9(St) | ∞ | 2.858 | | | |
| 10 | 14.91009 | 0.800 | 1.85150 | 40.78 | 0.56958 |
| 11 | 10.86623 | 4.141 | 1.61800 | 63.33 | 0.54414 |
| 12 | -36.30956 | 0.100 | | | |
| 13 | 11.71132 | 1.249 | 1.95375 | 32.32 | 0.59015 |
| 14 | 8.56782 | 1.088 | | | |
| 15 | 19.60669 | 4.311 | 1.49700 | 81.54 | 0.53748 |
| 16 | -8.30273 | 2.039 | 1.80518 | 25.42 | 0.61616 |
| 17 | -29.39562 | 0.451 | | | |
| *18 | 612.79893 | 3.309 | 1.80330 | 40.29 | 0.56886 |
| *19 | -31.68523 | DD[19] | | | |
| 20 | ∞ | 1.000 | 1.51633 | 64.14 | 0.53531 |
| 21 | ∞ | 6.277 | | | |

TABLE 2

Example 1

| | INFINITE DISTANCE | 100 mm |
|---|---|---|
| f' | 8.203 | 8.278 |
| FNo. | 1.89 | 1.94 |
| 2ω(°) | 71.8 | 70.4 |
| DD[8] | 4.234 | 3.591 |
| DD[19] | 5.123 | 5.766 |

TABLE 3

Example 1

| | SURFACE NUMBER | | | |
|---|---|---|---|---|
| | 3 | 4 | 18 | 19 |
| KA | -6.5760859E+04 | 1.3712447E+00 | 8.1184904E+03 | 9.9093510E-01 |
| A3 | 5.0127384E-04 | 1.8642627E-04 | -3.9224459E-05 | -8.6253731E-06 |
| A4 | 7.5519924E-04 | 8.9009268E-04 | 8.5286692E-05 | 9.8827831E-05 |

TABLE 3-continued

Example 1

SURFACE NUMBER

| | 3 | 4 | 18 | 19 |
|---|---|---|---|---|
| A5 | −9.2161696E−05 | −8.2998830E−05 | −1.5065665E−05 | 3.2931837E−06 |
| A6 | −4.5958235E−06 | −8.5579158E−06 | 4.4522270E−06 | −4.0434975E−06 |
| A7 | 1.4362806E−06 | 1.6098710E−06 | −6.1783472E−07 | 9.4137921E−07 |
| A8 | −2.6920751E−08 | 3.4006824E−08 | 5.3564138E−08 | −4.0910314E−08 |
| A9 | −1.0556861E−08 | 1.4743980E−08 | 6.4726389E−09 | −5.3667948E−09 |
| A10 | 4.9825721E−10 | −1.8198709E−10 | −3.2397011E−09 | −7.2310949E−10 |
| A11 | 4.2826352E−11 | 4.0439738E−11 | 1.8857226E−10 | 1.5328293E−10 |
| A12 | −2.8553088E−12 | −2.2968337E−12 | 3.7228084E−11 | −3.5201584E−12 |
| A13 | −1.1754131E−13 | 4.4619426E−13 | −3.5660486E−12 | −2.0147347E−12 |
| A14 | 8.3458721E−15 | 1.8096987E−14 | −1.1308474E−12 | 6.1706040E−13 |
| A15 | 1.0054767E−17 | −9.8228321E−16 | 2.0590787E−13 | −1.7506222E−13 |
| A16 | −2.7849296E−17 | 7.4278619E−15 | −2.4063921E−14 | 2.0727730E−14 |
| A17 | −5.8589694E−18 | −4.1440496E−16 | 8.0796604E−15 | 7.8226217E−17 |
| A18 | −6.0892851E−19 | −1.0632327E−16 | −1.4864238E−15 | −6.5005594E−17 |
| A19 | −1.1193247E−22 | −2.6066119E−17 | 1.1593496E−16 | −8.2921826E−18 |
| A20 | 6.9920850E−21 | 4.0359544E−18 | −3.7424287E−18 | 4.5657736E−19 |

Figure 11:
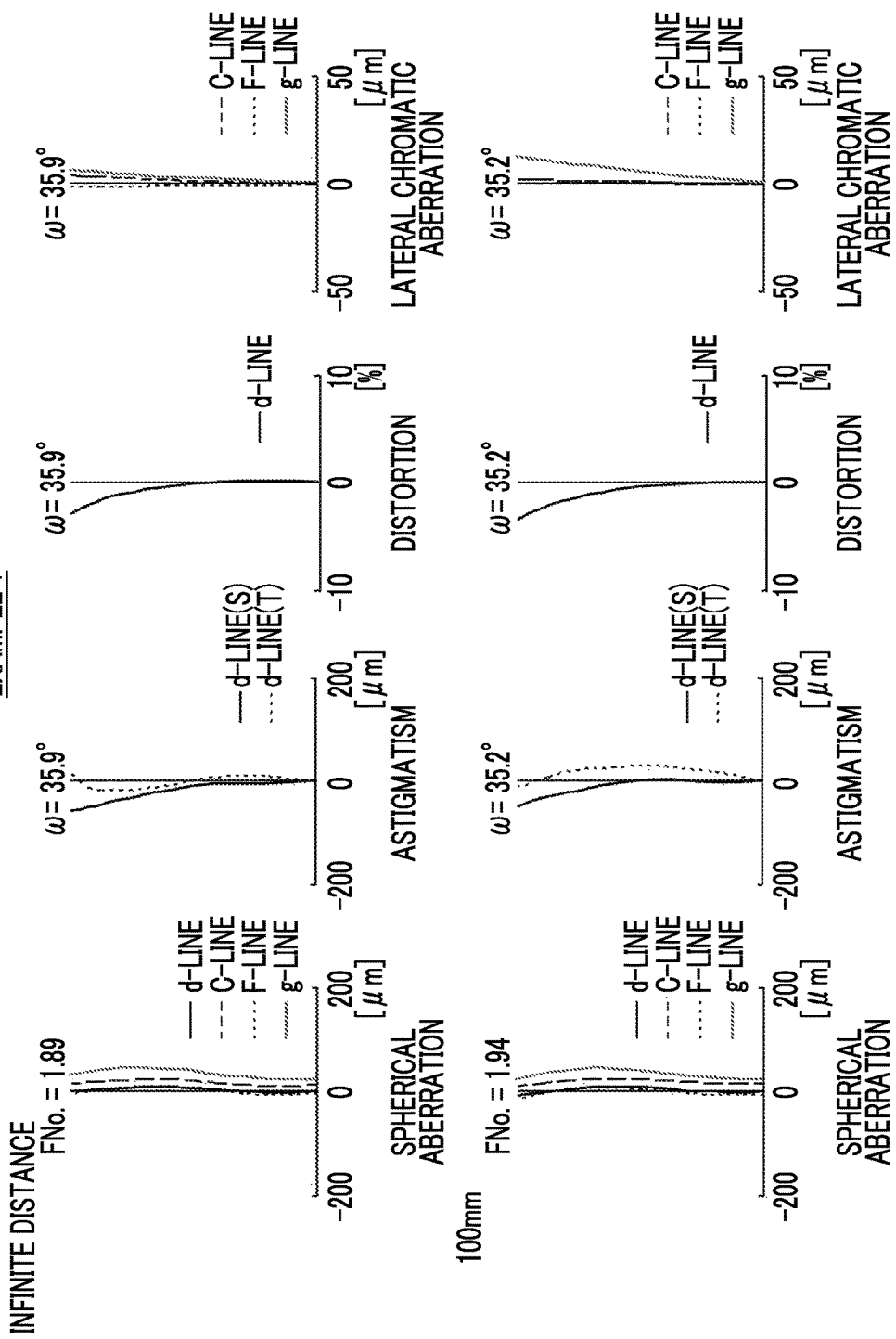
FIG. 11 is a diagram of aberrations of the imaging lens of Example 1 of the present invention, where the diagram includes spherical aberration diagram, astigmatism diagram, distortion diagram, and lateral chromatic aberration diagram, in order from the left side thereof.

FIG. 11 shows aberration diagrams of the imaging lens of Example 1. In order from the left side on the upper side of FIG. 11 denoted by the "infinite distance", spherical aberration, astigmatism, distortion, and lateral chromatic aberration (chromatic aberration of magnification) in a state where the infinite distance object is in focus are shown. In order from the left side on the lower side denoted by the "100 mm", spherical aberration, astigmatism, distortion, and lateral chromatic aberration in a state where the object at the object distance of 100 mm is in focus are shown. In the spherical aberration diagram, aberrations at the d-line (a wavelength of 587.6 nm), the C-line (a wavelength of 656.3 nm), the F-line (a wavelength of 486.1 nm), and the g-line (a wavelength of 435.8 nm) are respectively indicated by the solid line, the long dashed line, the short dashed line, and the gray solid line. In the astigmatism diagram, aberration in the sagittal direction at the d-line is indicated by the solid line, and aberration in the tangential direction at the d-line is indicated by the short dashed line. In the distortion diagram, aberration at the d-line is indicated by the solid line. In the lateral chromatic aberration, aberrations at the C-line, the F-line, and the g-line are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 12:
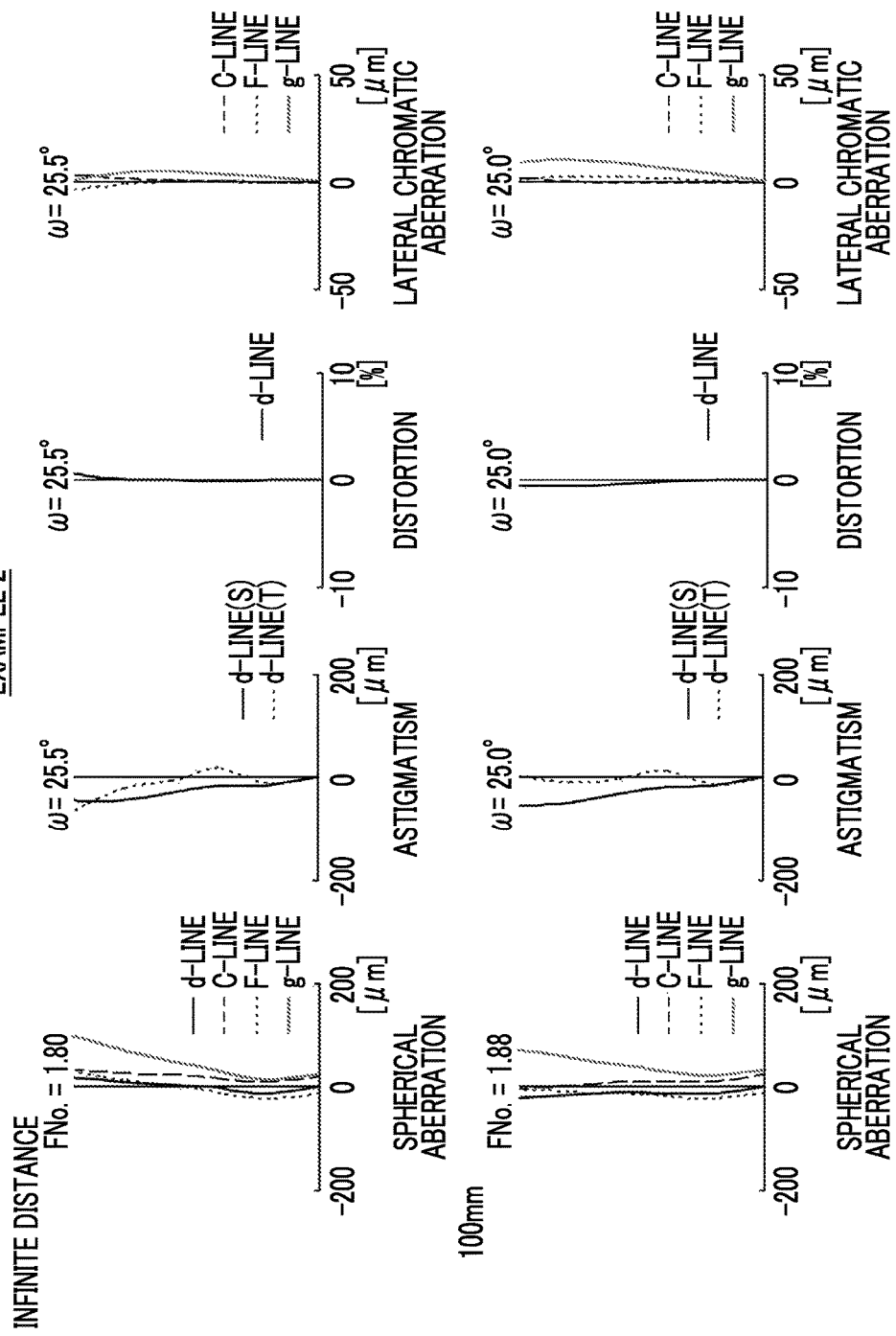
FIG. 12 is a diagram of aberrations of the imaging lens of Example 2 of the present invention, where the diagram includes spherical aberration diagram, astigmatism diagram, distortion diagram, and lateral chromatic aberration diagram, in order from the left side thereof.

FIG. 2 shows a lens configuration of the imaging lens of Example 2. The imaging lens of Example 2 includes, in order from the object side: the first lens group G1 that has a negative refractive power; the aperture diaphragm St; and the second lens group G2 that has a positive refractive power. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. Table 4 shows basic lens data of the imaging lens of Example 2, Table 5 shows specification and variable surface spacings, Table 6 shows aspheric coefficients, and FIG. 12 shows aberration diagrams.

TABLE 4

Example 2

| Si | Ri | Di | Ndj | vdj | θgFj |
|---|---|---|---|---|---|
| 1 | 28.25388 | 3.000 | 1.51999 | 64.23 | 0.53842 |
| 2 | 9.43714 | 2.278 | | | |
| 3 | 20.37355 | 2.126 | 1.58313 | 59.42 | 0.54109 |
| *4 | 8.15496 | 5.284 | | | |
| 5 | 24.96303 | 4.552 | 1.85001 | 43.00 | 0.56164 |
| 6 | −16.62318 | 1.010 | 1.72822 | 28.59 | 0.60201 |
| 7 | −65.60211 | DD[7] | | | |
| 8(St) | | 2.500 | | | |
| 9 | 26.07073 | 3.650 | 1.84999 | 43.00 | 0.56164 |
| 10 | −67.13297 | 1.742 | | | |
| 11 | 104.21680 | 1.000 | 1.62966 | 35.03 | 0.58659 |
| 12 | 12.90869 | 1.479 | | | |
| 13 | ∞ | 4.417 | 1.61800 | 63.33 | 0.54414 |
| 14 | −8.52855 | 1.000 | 1.85001 | 22.50 | 0.62144 |
| 15 | −17.95176 | 0.100 | | | |
| 16 | 33.78051 | 2.870 | 1.85001 | 43.00 | 0.56164 |
| 17 | −75.25912 | DD[17] | | | |
| 18 | ∞ | 1.000 | 1.51633 | 64.14 | 0.53531 |
| 19 | ∞ | 8.094 | | | |

TABLE 5

Example 2

| | INFINITE DISTANCE | 100 mm |
|---|---|---|
| f | 12.002 | 12.014 |
| FNo. | 1.80 | 1.88 |
| 2ω(°) | 51.0 | 50.0 |
| DD[7] | 8.000 | 6.684 |
| DD[17] | 5.000 | 6.316 |

TABLE 6

Example 2

| | SURFACE NUMBER 4 |
|---|---|
| KA | 1.0000000E+00 |
| A3 | −1.3877788E−18 |
| A4 | −4.7679435E−04 |
| A5 | 4.1230958E−04 |
| A6 | −2.2053568E−04 |
| A7 | 3.9608592E−05 |
| A8 | 6.6325205E−06 |
| A9 | −3.4581194E−06 |
| A10 | 1.2937775E−07 |
| A11 | 1.1466528E−07 |
| A12 | −1.1972444E−08 |
| A13 | −2.0267559E−09 |
| A14 | 3.0383946E−10 |
| A15 | 2.0106321E−11 |
| A16 | −3.8615337E−12 |
| A17 | −1.0591085E−13 |
| A18 | 2.4952229E−14 |
| A19 | 2.3109395E−16 |
| A20 | −6.5102833E−17 |

Example 3

Figure 3:
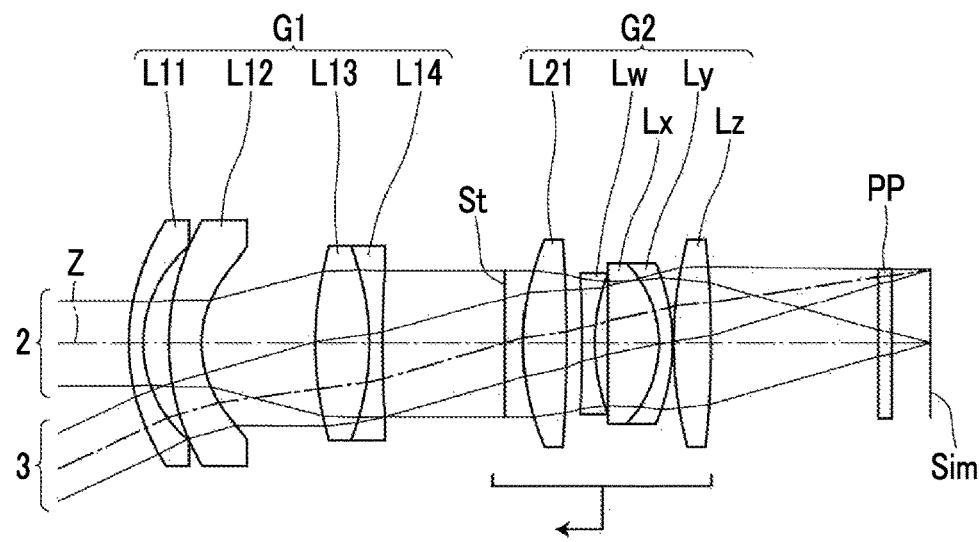
FIG. 3 is a cross-sectional view illustrating a configuration and an optical path of an imaging lens of Example 3 of the present invention.
Figure 13:
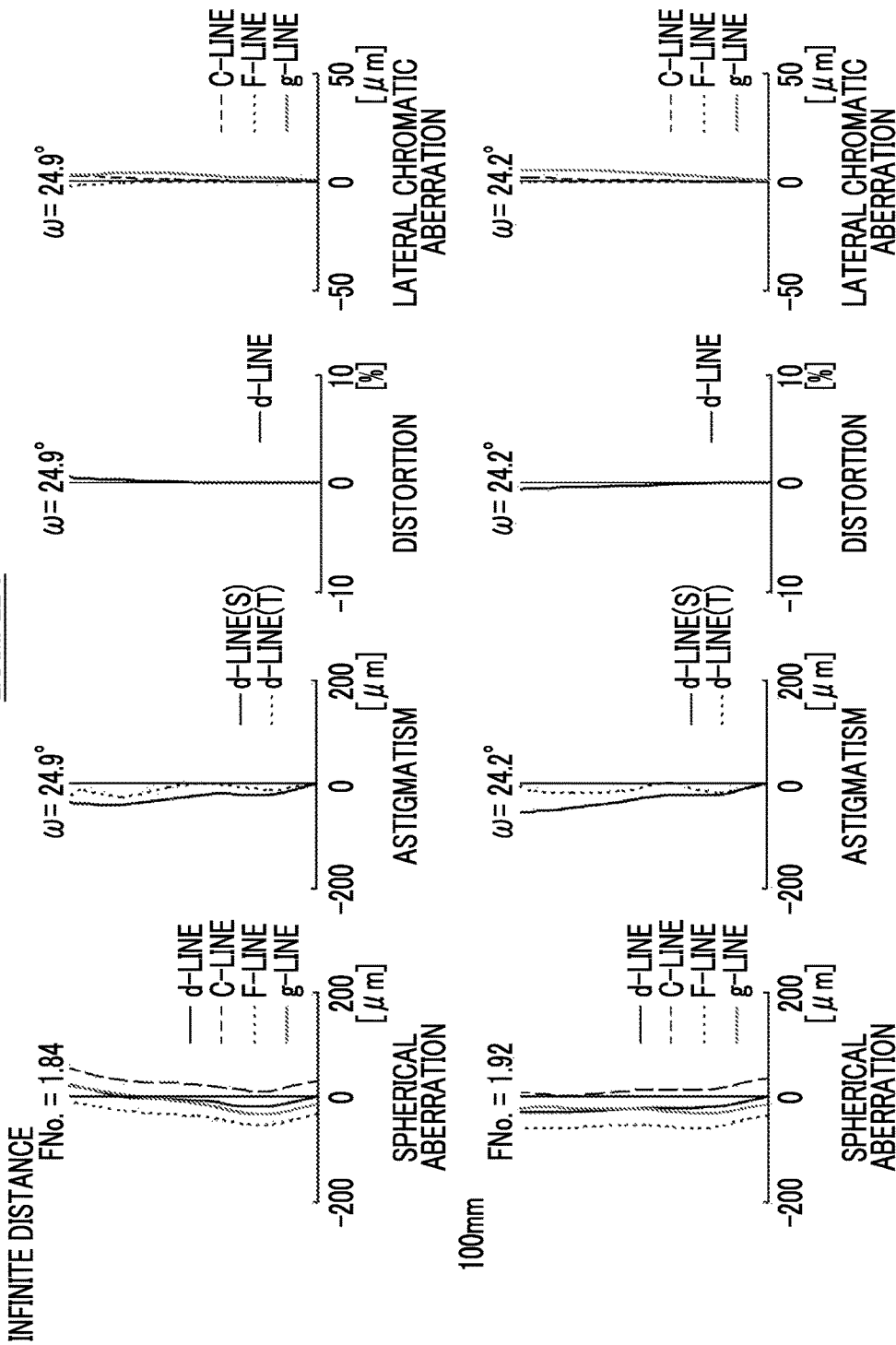
FIG. 13 is a diagram of aberrations of the imaging lens of Example 3 of the present invention, where the diagram includes spherical aberration diagram, astigmatism diagram, distortion diagram, and lateral chromatic aberration diagram, in order from the left side thereof.

FIG. 3 shows a lens configuration of the imaging lens of Example 3. The imaging lens of Example 3 includes, in order from the object side: the first lens group G1 that has a positive refractive power; the aperture diaphragm St; and the second lens group G2 that has a positive refractive power. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. Table 7 shows basic lens data of the imaging lens of Example 3, Table 8 shows specification and variable surface spacings, Table 9 shows aspheric coefficients, and FIG. 13 shows aberration diagrams.

TABLE 7

Example 3

| Si | Ri | Di | Ndj | vdj | θgFj |
|---|---|---|---|---|---|
| 1 | 16.73454 | 1.110 | 1.59551 | 39.24 | 0.58043 |
| 2 | 9.64308 | 2.040 | | | |
| *3 | 20.48450 | 2.500 | 1.56867 | 58.27 | 0.55151 |
| *4 | 8.19082 | 8.770 | | | |
| 5 | 27.23557 | 4.170 | 1.85150 | 40.78 | 0.56958 |
| 6 | −20.41300 | 1.010 | 1.51742 | 52.43 | 0.55649 |
| 7 | 88.85300 | DD[7] | | | |
| 8(St) | ∞ | 1.370 | | | |
| 9 | 20.26847 | 3.340 | 1.77250 | 49.60 | 0.55212 |
| 10 | −108.91135 | 1.180 | | | |
| 11 | −126.43380 | 1.000 | 1.84666 | 23.78 | 0.62054 |
| 12 | 15.62501 | 1.000 | | | |
| 13 | ∞ | 3.940 | 1.61800 | 63.33 | 0.54414 |
| 14 | −8.98500 | 1.030 | 1.90366 | 31.31 | 0.59481 |
| 15 | −15.87346 | 0.100 | | | |
| 16 | 31.12171 | 2.880 | 1.85150 | 40.78 | 0.56958 |
| 17 | −76.58322 | DD[17] | | | |
| 18 | ∞ | 1.000 | 1.51633 | 64.14 | 0.53531 |
| 19 | ∞ | 3.014 | | | |

TABLE 8

Example 3

| | INFINITE DISTANCE | 100 mm |
|---|---|---|
| f | 12.306 | 12.300 |
| FNo. | 1.84 | 1.92 |
| 2ω(°) | 49.8 | 48.4 |
| DD[7] | 9.450 | 8.070 |
| DD[17] | 13.000 | 14.380 |

TABLE 9

Example 3

| | SURFACE NUMBER | |
|---|---|---|
| | 3 | 4 |
| KA | 1.0000000E+00 | 1.0000000E+00 |
| A3 | −1.6263033E−20 | −1.1102230E−17 |
| A4 | 3.5305882E−05 | −5.3210953E−04 |
| A5 | 3.2705589E−05 | 6.3786863E−04 |
| A6 | −7.3658249E−06 | −3.0356011E−04 |
| A7 | −1.5872361E−06 | 3.3124536E−05 |
| A8 | 5.5719112E−07 | 1.8304262E−05 |
| A9 | 4.0471616E−08 | −5.5971025E−06 |
| A10 | −2.1871851E−08 | −1.4426568E−07 |
| A11 | −5.5704902E−10 | 2.3033630E−07 |
| A12 | 5.0481547E−10 | −1.3655257E−08 |
| A13 | 3.5594429E−12 | −4.6423062E−09 |
| A14 | −7.1360026E−12 | 4.6748243E−10 |
| A15 | 2.9234711E−16 | 5.0558942E−11 |
| A16 | 6.0895269E−14 | −6.5344225E−12 |
| A17 | −1.2400796E−16 | −2.8597951E−13 |
| A18 | −2.8838813E−16 | 4.3484212E−14 |
| A19 | 4.6235585E−19 | 6.6017355E−16 |
| A20 | 5.8223035E−19 | −1.1329876E−16 |

Example 4

Figure 4:
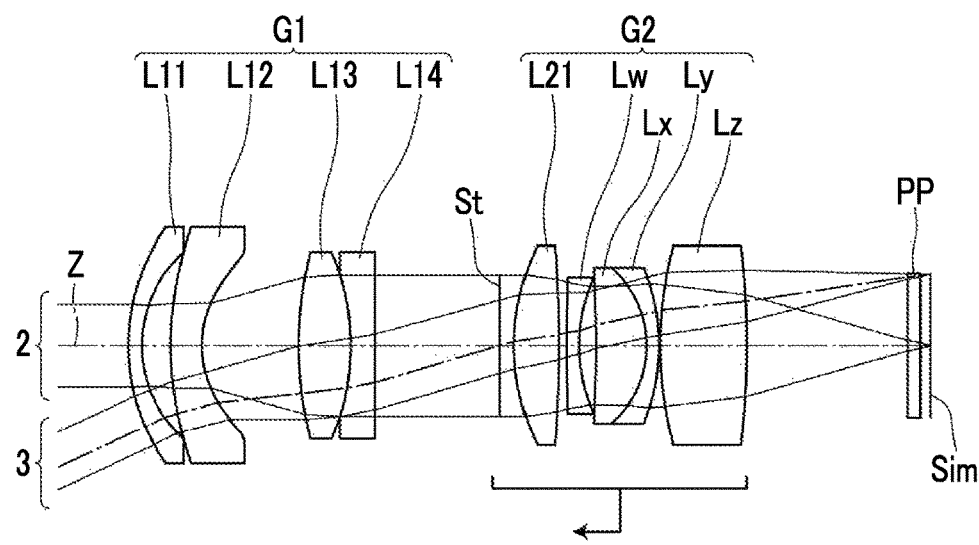
FIG. 4 is a cross-sectional view illustrating a configuration and an optical path of an imaging lens of Example 4 of the present invention.
Figure 14:
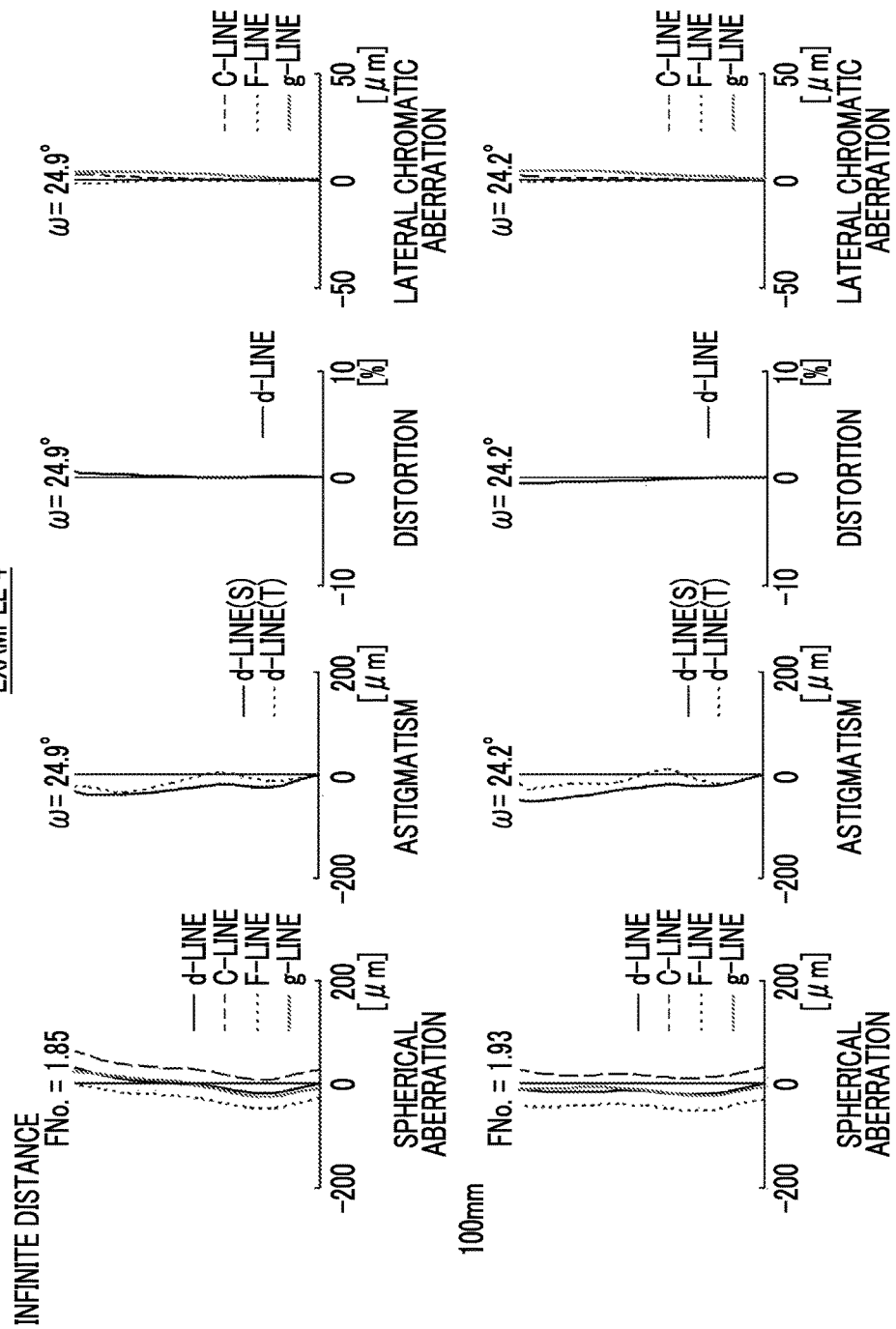
FIG. 14 is a diagram of aberrations of the imaging lens of Example 4 of the present invention, where the diagram includes spherical aberration diagram, astigmatism diagram, distortion diagram, and lateral chromatic aberration diagram, in order from the left side thereof.

FIG. 4 shows a lens configuration of the imaging lens of Example 4. The imaging lens of Example 4 includes, in order from the object side: the first lens group G1 that has a positive refractive power; the aperture diaphragm St; and the second lens group G2 that has a positive refractive power. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. Table 10 shows basic lens data of the imaging lens of Example 4, Table 11 shows specification and variable surface spacings, Table 12 shows aspheric coefficients, and FIG. 14 shows aberration diagrams.

TABLE 10

Example 4

| Si | Ri | Di | Ndj | vdj | θgFj |
|---|---|---|---|---|---|
| 1 | 16.32605 | 1.083 | 1.59551 | 39.24 | 0.58043 |
| 2 | 9.95449 | 2.364 | | | |
| *3 | 27.75421 | 2.500 | 1.56867 | 58.27 | 0.55151 |
| *4 | 8.15865 | 7.782 | | | |
| 5 | 30.03253 | 4.190 | 1.85150 | 40.78 | 0.56958 |
| 6 | −19.04516 | 1.947 | 1.51742 | 52.43 | 0.55649 |
| 7 | 12152868.54540 | DD[7] | | | |
| 8(St) | ∞ | 1.160 | | | |
| 9 | 18.14911 | 3.563 | 1.77250 | 49.60 | 0.55212 |

TABLE 10-continued

Example 4

| Si | Ri | Di | Ndj | vdj | θgFj |
|---|---|---|---|---|---|
| 10 | −105.13419 | 0.619 | | | |
| 11 | 144.23785 | 1.000 | 1.84666 | 23.78 | 0.62054 |
| 12 | 13.11875 | 1.360 | | | |
| 13 | −100.00000 | 4.061 | 1.61800 | 63.33 | 0.54414 |
| 14 | −8.37026 | 1.000 | 1.85026 | 32.27 | 0.59299 |
| 15 | −16.45248 | 0.100 | | | |
| 16 | 30.75252 | 7.000 | 1.85150 | 40.78 | 0.56958 |
| 17 | −69.97770 | DD[17] | | | |
| 18 | ∞ | 1.000 | 1.51633 | 64.14 | 0.53531 |
| 19 | ∞ | 0.839 | | | |

TABLE 11

Example 4

| | INFINITE DISTANCE | 100 mm |
|---|---|---|
| f' | 12.306 | 12.289 |
| FNo. | 1.85 | 1.93 |
| 2ω(°) | 49.8 | 48.4 |
| DD[7] | 10.044 | 8.668 |
| DD[17] | 13.000 | 14.376 |

TABLE 12

Example 4

| | SURFACE NUMBER | |
|---|---|---|
| | 3 | 4 |
| KA | 1.0000000E+00 | 1.0000000E+00 |
| A3 | 2.1684043E−20 | −2.7755576E−18 |
| A4 | 2.8580317E−05 | −5.7408451E−04 |
| A5 | 1.0933266E−05 | 6.2225531E−04 |
| A6 | −3.9414420E−06 | −3.0008983E−04 |
| A7 | −3.0942845E−07 | 3.3980995E−05 |
| A8 | 1.7176164E−07 | 1.7782192E−05 |
| A9 | −5.5695235E−09 | −5.6261782E−06 |
| A10 | −2.9267721E−09 | −1.1178004E−07 |
| A11 | 4.8796545E−10 | 2.3095750E−07 |
| A12 | −1.5224301E−11 | −1.4725651E−08 |
| A13 | −1.1405809E−11 | −4.6505765E−09 |
| A14 | 1.3987927E−12 | 4.8765505E−10 |
| A15 | 1.3091627E−13 | 5.0623508E−11 |
| A16 | −2.2400600E−14 | −6.7515145E−12 |
| A17 | −7.5684471E−16 | −2.8627614E−13 |
| A18 | 1.5747319E−16 | 4.4722692E−14 |
| A19 | 1.7647928E−18 | 6.6073596E−16 |
| A20 | −4.2486411E−19 | −1.1620259E−16 |

Example 5

Figure 5:
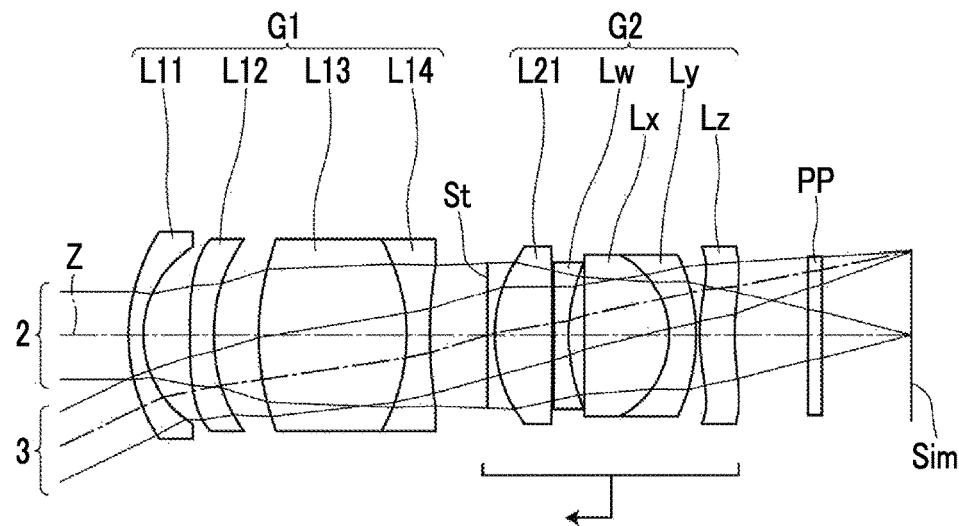
FIG. 5 is a cross-sectional view illustrating a configuration and an optical path of an imaging lens of Example 5 of the present invention.
Figure 15:
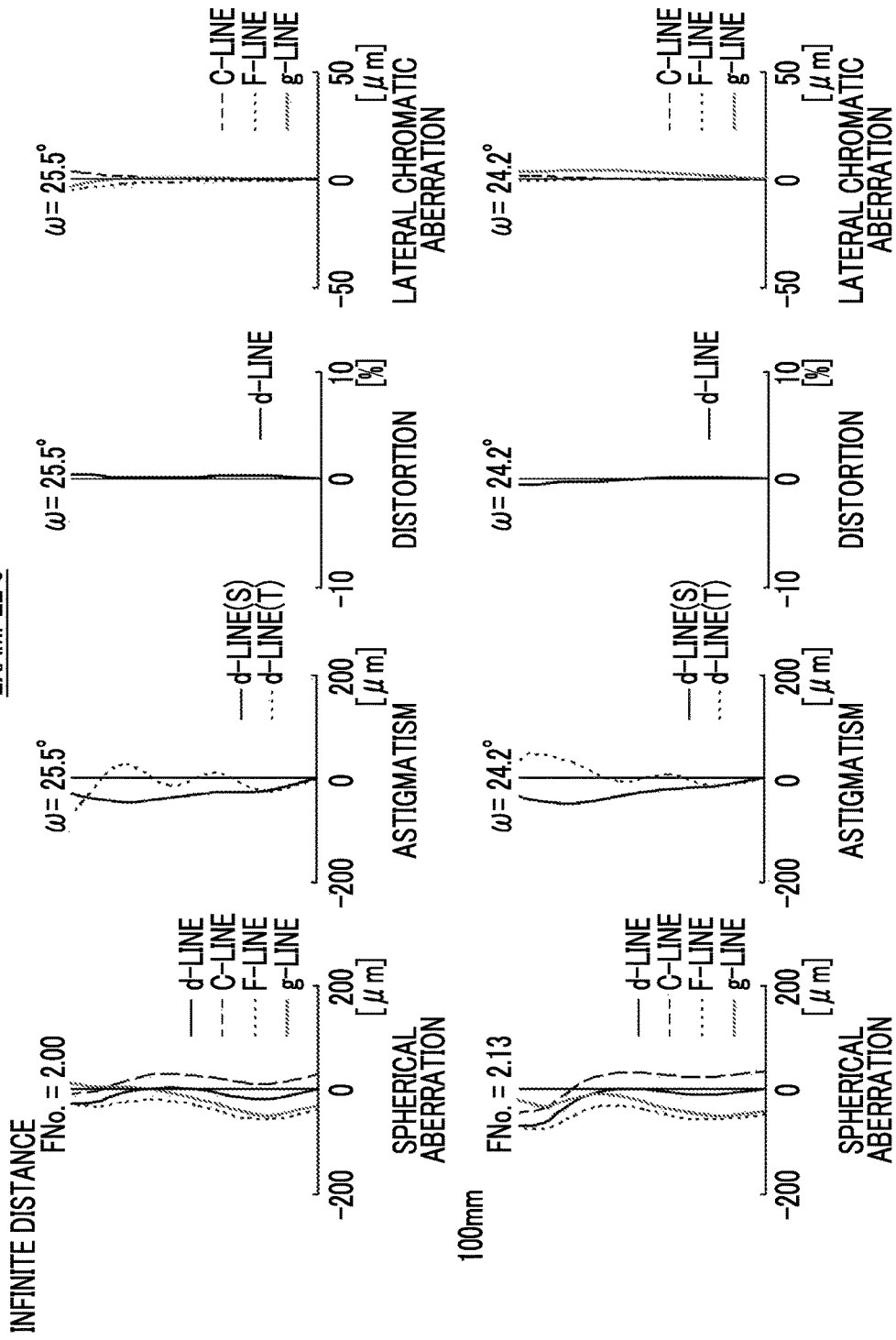
FIG. 15 is a diagram of aberrations of the imaging lens of Example 5 of the present invention, where the diagram includes spherical aberration diagram, astigmatism diagram, distortion diagram, and lateral chromatic aberration diagram, in order from the left side thereof.

FIG. 5 shows a lens configuration of the imaging lens of Example 5. The imaging lens of Example 5 includes, in order from the object side: the first lens group G1 that has a negative refractive power; the aperture diaphragm St; and the second lens group G2 that has a positive refractive power. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. Table 13 shows basic lens data of the imaging lens of Example 5, Table 14 shows specification and variable surface spacings, Table 15 shows aspheric coefficients, and FIG. 15 shows aberration diagrams.

TABLE 13

Example 5

| Si | Ri | Di | Ndj | vdj | θgFj |
|---|---|---|---|---|---|
| 1 | 12.83562 | 1.000 | 1.90366 | 31.31 | 0.59481 |
| 2 | 6.99091 | 3.182 | | | |
| *3 | 61.98746 | 1.645 | 1.53391 | 55.87 | 0.55939 |
| *4 | 14.43584 | 3.022 | | | |
| 5 | 18.42163 | 10.000 | 1.83400 | 37.16 | 0.57759 |
| 6 | −13.22022 | 1.566 | 1.51742 | 52.43 | 0.55649 |
| 7 | 29.82262 | DD[7] | | | |
| 8(St) | ∞ | 0.500 | | | |
| 9 | 10.16723 | 3.847 | 1.77250 | 49.60 | 0.55212 |
| 10 | −225.33523 | 0.100 | | | |
| 11 | −376.41576 | 1.000 | 1.80518 | 25.42 | 0.61616 |
| 12 | 12.54542 | 1.039 | | | |
| 13 | ∞ | 5.752 | 1.61800 | 63.33 | 0.54414 |
| 14 | −6.19663 | 1.830 | 1.80000 | 29.84 | 0.60178 |
| 15 | −12.78905 | 0.234 | | | |
| *16 | 13.49042 | 2.364 | 1.53391 | 55.87 | 0.55939 |
| *17 | 17.26842 | DD[17] | | | |
| 15 | ∞ | 1.000 | 1.51633 | 64.14 | 0.53531 |
| 19 | ∞ | 6.060 | | | |

TABLE 14

Example 5

| | INFINITE DISTANCE | 100 mm |
|---|---|---|
| f' | 12.010 | 12.153 |
| FNo. | 2.00 | 2.13 |
| 2ω(°) | 51.0 | 48.4 |
| DD[7] | 3.935 | 2.490 |
| DD[17] | 5.000 | 6.445 |

TABLE 15

Example 5

| | SURFACE NUMBER | | | |
|---|---|---|---|---|
| | 3 | 4 | 16 | 17 |
| KA | 1.0000000E+00 | 1.0000000E+00 | 1.0000000E+00 | 1.0000000E+00 |
| A3 | 6.9388939E−19 | 0.0000000E+00 | 2.0383001E−18 | 6.9388939E−19 |
| A4 | 3.4810087E−04 | −5.9275763E−04 | −1.1310106E−03 | −6.3914091E−04 |
| A5 | 8.1741868E−05 | 1.0757143E−03 | 4.9024198E−04 | 1.5457730E−05 |
| A6 | 5.2900992E−05 | −3.9103308E−04 | −1.1083102E−04 | 6.8293275E−05 |
| A7 | −2.9760433E−05 | 1.5842551E−05 | −3.6126998E−05 | 4.5677841E−05 |
| A8 | −1.3440509E−07 | 2.5517890E−05 | 1.3683629E−05 | 3.8084317E−06 |
| A9 | 1.9541905E−06 | −5.3992076E−06 | 1.1810234E−06 | 2.7991788E−06 |
| A10 | −1.4468915E−07 | −4.1212356E−07 | −7.2957209E−07 | −4.7132806E−07 |

TABLE 15-continued

Example 5

SURFACE NUMBER

| | 3 | 4 | 16 | 17 |
|---|---|---|---|---|
| A11 | −6.0130002E−08 | 2.3443076E−07 | −2.2137803E−08 | −8.2712995E−08 |
| A12 | 6.0633588E−09 | −7.8401978E−09 | 2.1501033E−08 | 1.7717389E−08 |
| A13 | 1.0428727E−09 | −4.8035027E−09 | 2.4538411E−10 | 1.3882993E−09 |
| A14 | −1.0992450E−10 | 3.9356177E−10 | −3.7021590E−10 | −3.3508292E−10 |
| A15 | −1.0436296E−11 | 5.2706647E−11 | −1.5591446E−12 | −1.3484271E−11 |
| A16 | 1.0129092E−12 | −6.0304373E−12 | 3.7000591E−12 | 3.4525756E−12 |
| A17 | 5.6214703E−14 | −2.9943536E−13 | 5.0635543E−14 | 7.0663743E−14 |
| A18 | −4.5724991E−15 | 4.2050227E−14 | −1.9871592E−14 | −1.8507095E−14 |
| A19 | −1.2619718E−16 | 6.9331013E−16 | −6.0048612E−18 | −1.5473950E−16 |
| A20 | 7.8042185E−18 | −1.1309025E−16 | 4.4334504E−17 | 4.0461628E−17 |

Example 6

Figure 6:
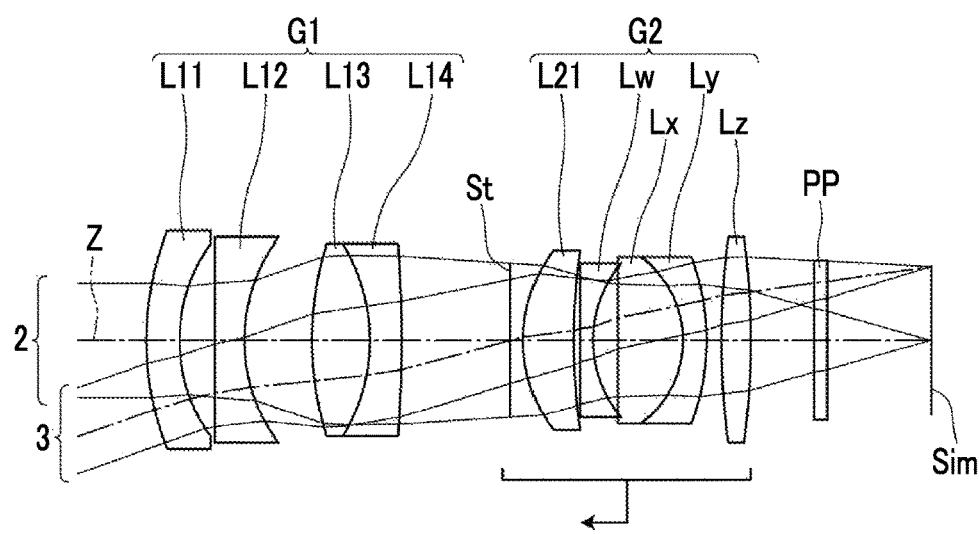
FIG. 6 is a cross-sectional view illustrating a configuration and an optical path of an imaging lens of Example 6 of the present invention.
Figure 16:
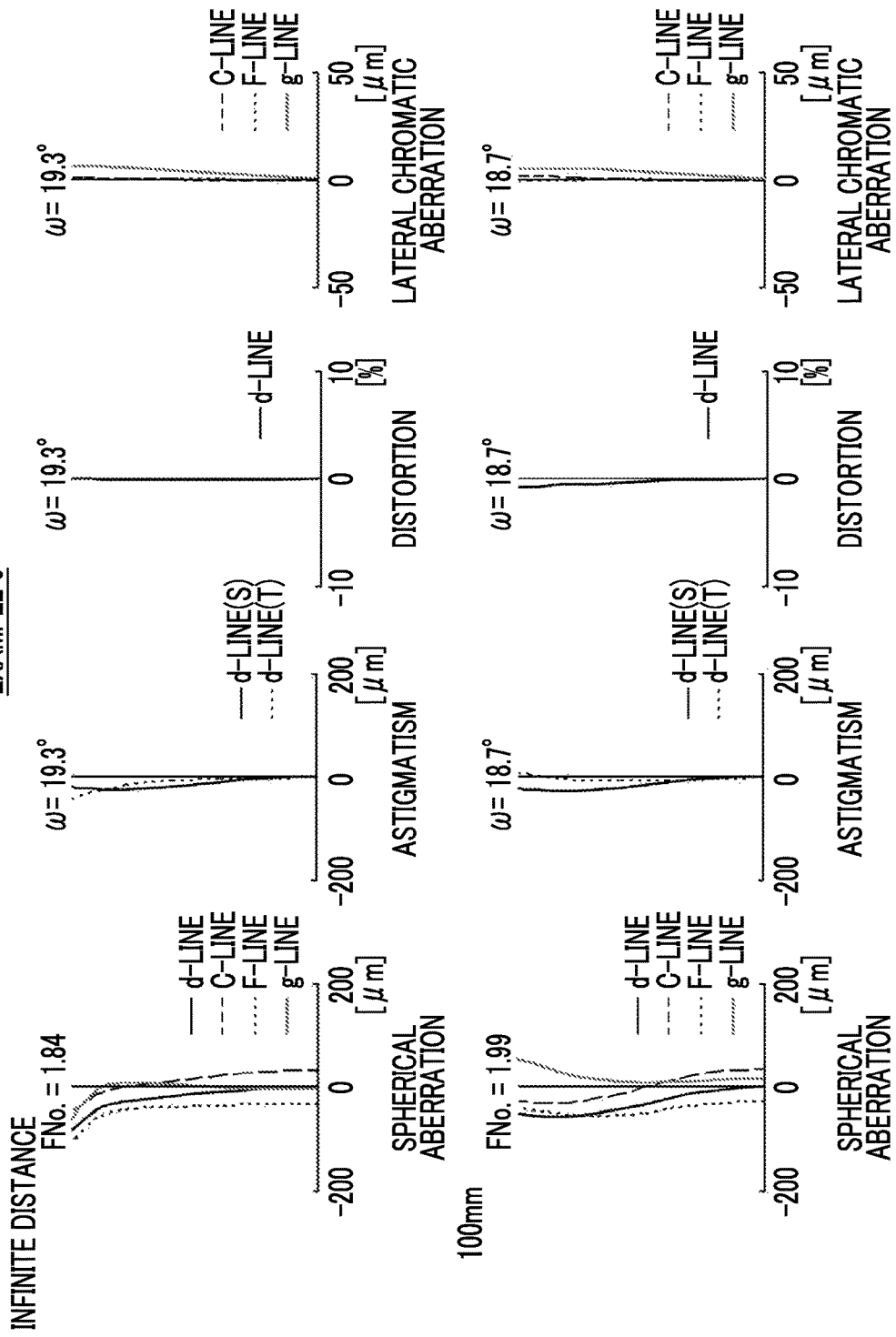
FIG. 16 is a diagram of aberrations of the imaging lens of Example 6 of the present invention, where the diagram includes spherical aberration diagram, astigmatism diagram, distortion diagram, and lateral chromatic aberration diagram, in order from the left side thereof.

FIG. 6 shows a lens configuration of the imaging lens of Example 6. The imaging lens of Example 6 includes, in order from the object side: the first lens group G1 that has a positive refractive power; the aperture diaphragm St; and the second lens group G2 that has a positive refractive power. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. Table 16 shows basic lens data of the imaging lens of Example 6, Table 17 shows specification and variable surface spacings, and FIG. 16 shows aberration diagrams thereof.

Example 7

Figure 7:
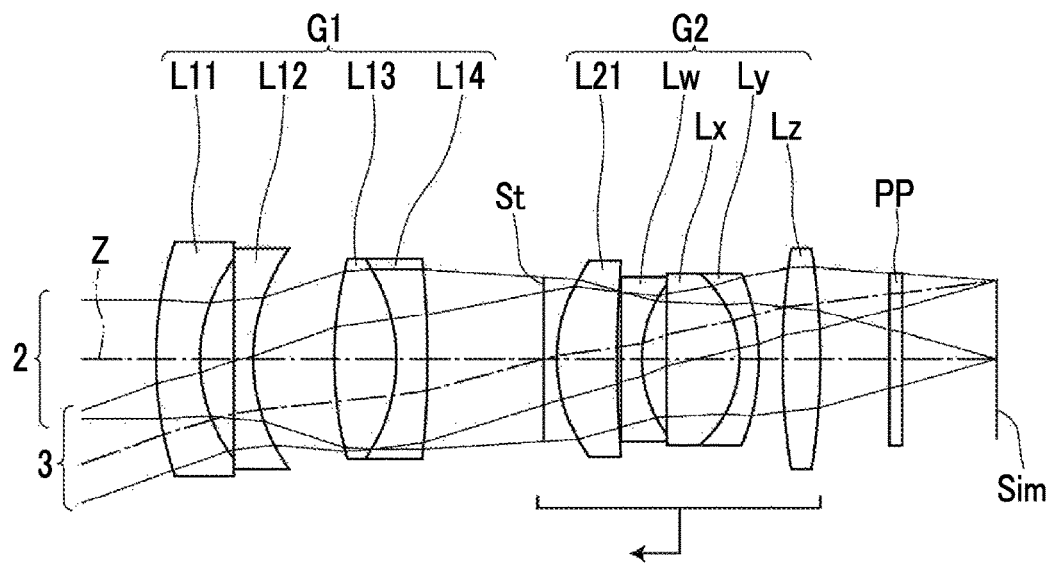
FIG. 7 is a cross-sectional view illustrating a configuration and an optical path of an imaging lens of Example 7 of the present invention.
Figure 17:
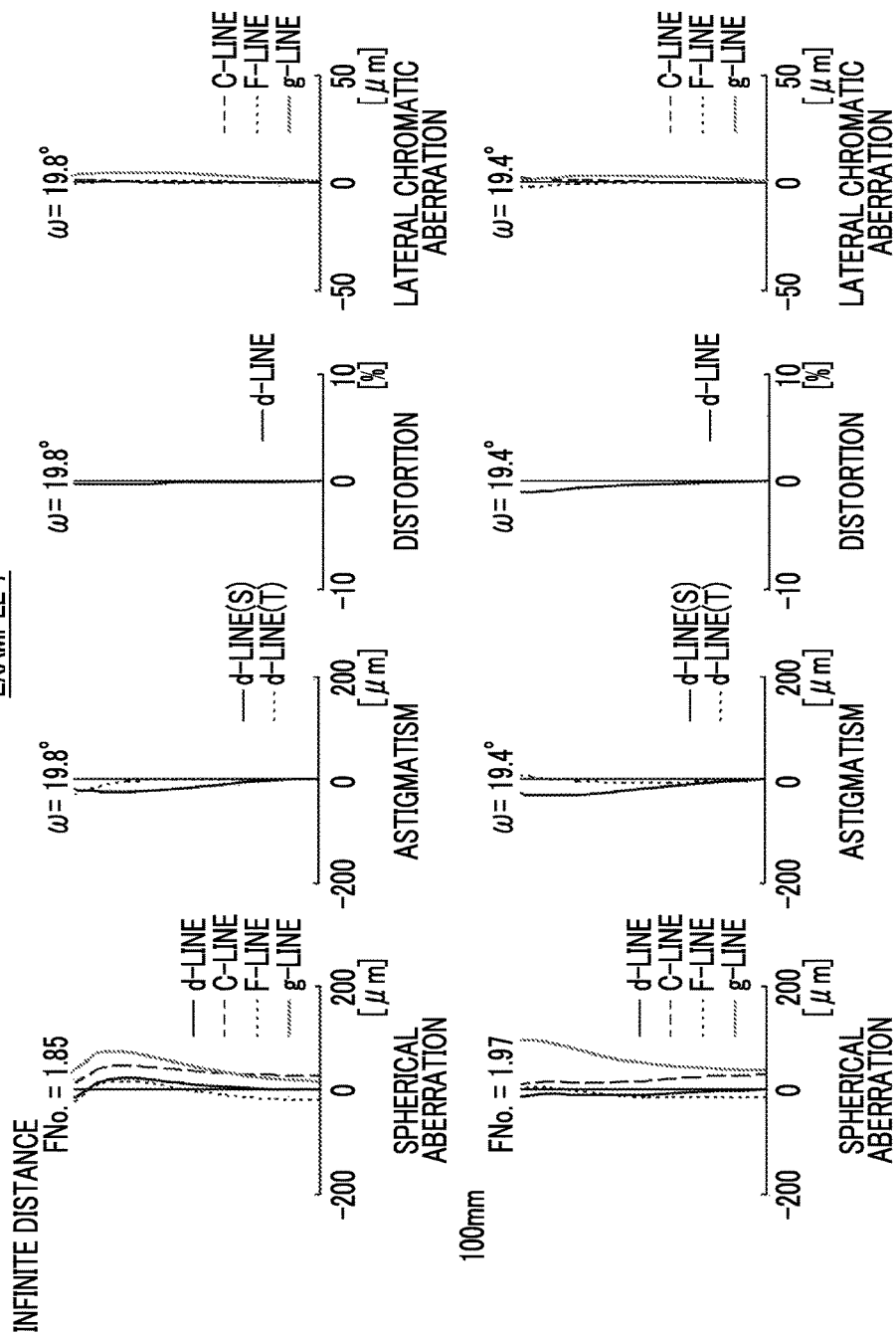
FIG. 17 is a diagram of aberrations of the imaging lens of Example 7 of the present invention, where the diagram includes spherical aberration diagram, astigmatism diagram, distortion diagram, and lateral chromatic aberration diagram, in order from the left side thereof.

FIG. 7 shows a lens configuration of the imaging lens of Example 7. The imaging lens of Example 7 includes, in order from the object side: the first lens group G1 that has a positive refractive power; the aperture diaphragm St; and the second lens group G2 that has a positive refractive power. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. Table 18 shows basic lens data of the imaging lens of Example 7, Table 19 shows specification and variable surface spacings, and FIG. 17 shows aberration diagrams thereof.

TABLE 16

Example 6

| Si | Ri | Di | Ndj | νdj | θgFj |
|---|---|---|---|---|---|
| 1 | 22.97894 | 2.625 | 1.75500 | 52.32 | 0.54785 |
| 2 | 12.82399 | 2.754 | | | |
| 3 | ∞ | 2.300 | 1.51742 | 52.43 | 0.55649 |
| 4 | 13.39073 | 5.269 | | | |
| 5 | 25.27066 | 4.500 | 1.81600 | 46.62 | 0.55682 |
| 6 | −14.39894 | 2.460 | 1.57489 | 40.96 | 0.57487 |
| 7 | −108.94931 | DD[7] | | | |
| 8(St) | ∞ | 1.000 | | | |
| 9 | 11.65838 | 3.900 | 1.83189 | 44.81 | 0.55802 |
| 10 | 49.28826 | 0.500 | | | |
| 11 | ∞ | 1.000 | 1.69953 | 30.03 | 0.59812 |
| 12 | 9.32185 | 1.950 | | | |
| 13 | ∞ | 5.055 | 1.72095 | 55.45 | 0.54271 |
| 14 | −8.10000 | 1.838 | 2.00069 | 25.46 | 0.61364 |
| 15 | −18.31879 | 1.147 | | | |
| 16 | 59.37308 | 2.300 | 1.95375 | 32.32 | 0.59015 |
| 17 | −59.37308 | DD[17] | | | |
| 18 | ∞ | 1.000 | 1.51680 | 64.20 | 0.53430 |
| 19 | ∞ | 8.175 | | | |

TABLE 17

Example 6

| | INFINITE DISTANCE | 100 mm |
|---|---|---|
| f | 16.431 | 16.092 |
| FNo. | 1.84 | 1.99 |
| 2ω(°) | 38.6 | 37.4 |
| DD[7] | 8.500 | 5.996 |
| DD[17] | 5.000 | 7.504 |

TABLE 18

Example 7

| Si | Ri | Di | Ndj | νdj | θgFj |
|---|---|---|---|---|---|
| 1 | 27.17511 | 3.200 | 1.51823 | 58.90 | 0.54567 |
| 2 | 11.69300 | 2.500 | | | |
| 3 | ∞ | 1.400 | 1.51742 | 52.43 | 0.55649 |
| 4 | 13.52572 | 5.880 | | | |
| 5 | 28.52199 | 4.500 | 1.85150 | 40.78 | 0.56958 |
| 6 | −12.74200 | 2.260 | 1.67270 | 32.10 | 0.59891 |
| 7 | −68.26887 | DD[7] | | | |
| 8(St) | ∞ | 0.920 | | | |
| 9 | 12.15069 | 4.300 | 1.85150 | 40.78 | 0.56958 |
| 10 | 86.04219 | 0.300 | | | |
| 11 | ∞ | 1.500 | 1.76182 | 26.52 | 0.61361 |
| 12 | 9.24776 | 1.780 | | | |
| 13 | 481.54314 | 5.290 | 1.61800 | 63.33 | 0.54414 |
| 14 | −8.19600 | 1.410 | 2.00069 | 25.46 | 0.61364 |
| 15 | −16.34972 | 1.700 | | | |
| 16 | 50.36544 | 2.800 | 1.95375 | 32.32 | 0.59015 |
| 17 | −50.36544 | DD[17] | | | |
| 18 | ∞ | 1.000 | 1.51680 | 64.20 | 0.53430 |
| 19 | ∞ | 6.861 | | | |

TABLE 19

Example 7

| | INFINITE DISTANCE | 100 mm |
|---|---|---|
| f | 16.027 | 15.687 |
| FNo. | 1.85 | 1.97 |
| 2ω(°) | 39.6 | 38.8 |
| DD[7] | 8.500 | 6.118 |
| DD[17] | 5.000 | 7.382 |

Example 8

Figure 8:
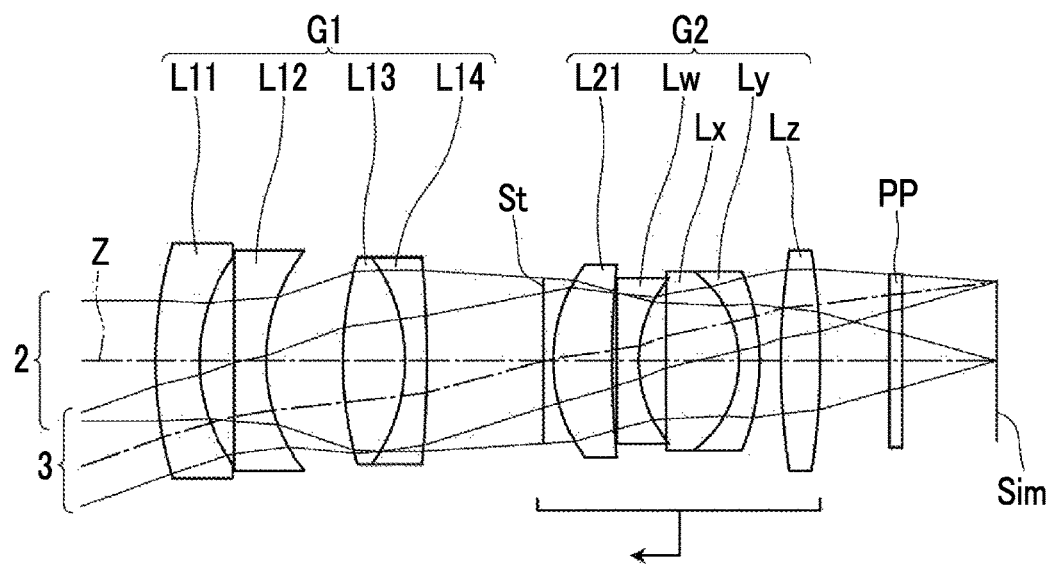
FIG. 8 is a cross-sectional view illustrating a configuration and an optical path of an imaging lens of Example 8 of the present invention.
Figure 18:
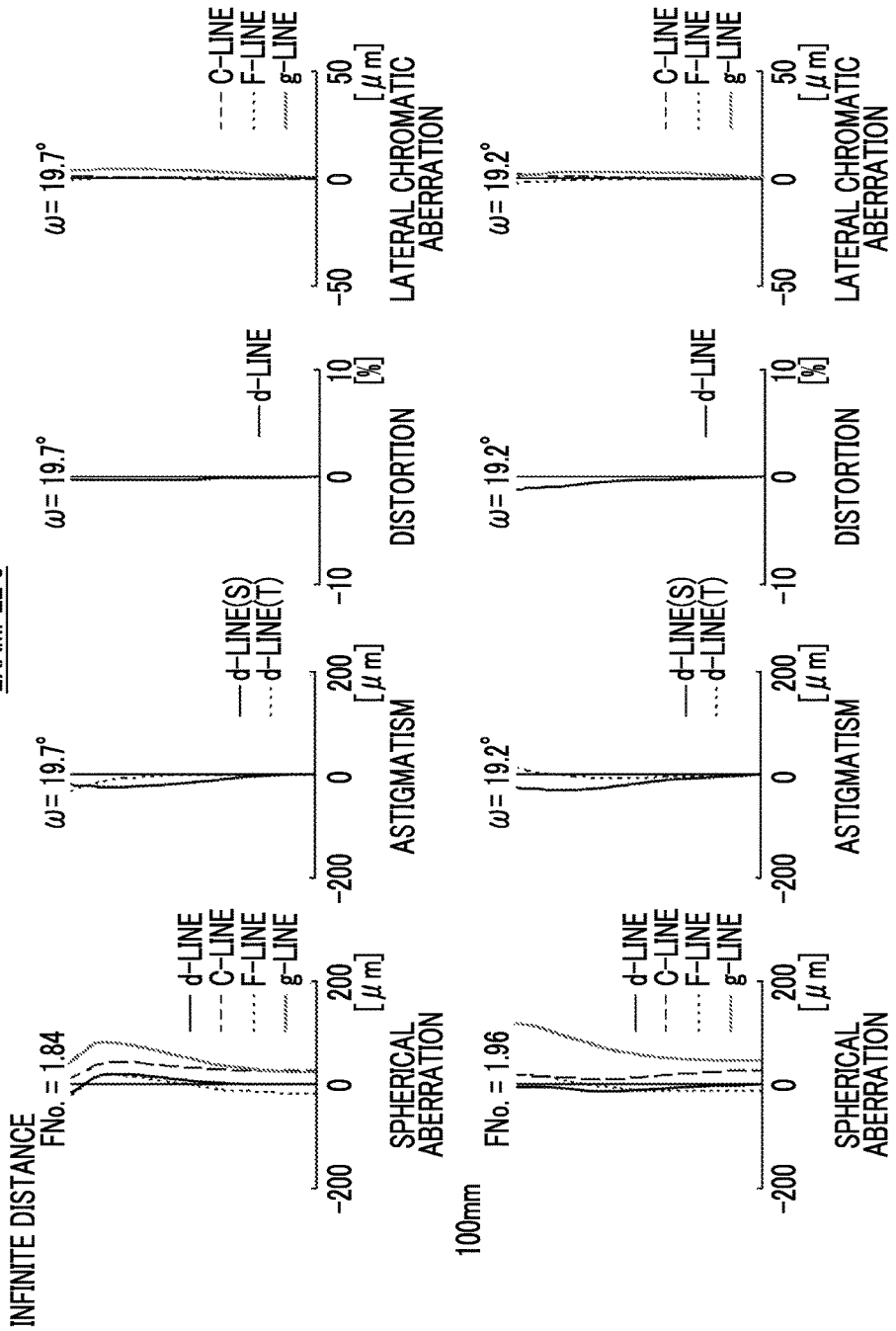
FIG. 18 is a diagram of aberrations of the imaging lens of Example 8 of the present invention, where the diagram includes spherical aberration diagram, astigmatism diagram, distortion diagram, and lateral chromatic aberration diagram, in order from the left side thereof.

FIG. 8 shows a lens configuration of the imaging lens of Example 8. The imaging lens of Example 8 includes, in order from the object side: the first lens group G1 that has a positive refractive power; the aperture diaphragm St; and the second lens group G2 that has a positive refractive power. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. Table 20 shows basic lens data of the imaging lens of Example 8, Table 21 shows specification and variable surface spacings, and FIG. 18 shows aberration diagrams thereof.

TABLE 20

Example 8

| Si | Ri | Di | Ndj | vdj | θgFj |
|---|---|---|---|---|---|
| 1 | 29.63461 | 3.200 | 1.51823 | 58.90 | 0.54567 |
| 2 | 12.78892 | 2.550 | | | |
| 3 | ∞ | 2.300 | 1.51742 | 52.43 | 0.55649 |
| 4 | 12.86389 | 5.555 | | | |
| 5 | 26.84115 | 4.500 | 1.83481 | 42.72 | 0.56486 |
| 6 | −12.93232 | 1.589 | 1.63980 | 34.47 | 0.59233 |
| 7 | −78.66091 | DD[7] | | | |
| 8(St) | ∞ | 0.692 | | | |
| 9 | 12.01785 | 4.200 | 1.85150 | 40.78 | 0.56958 |
| 10 | 72.12516 | 0.340 | | | |
| 11 | ∞ | 1.591 | 1.76182 | 26.52 | 0.61361 |
| 12 | 9.28562 | 1.950 | | | |
| 13 | 448.97458 | 5.311 | 1.65160 | 58.55 | 0.54287 |
| 14 | −8.05000 | 1.493 | 2.00069 | 25.46 | 0.61364 |
| 15 | −16.93773 | 1.529 | | | |
| 16 | 51.31113 | 2.900 | 1.95375 | 32.32 | 0.59015 |
| 17 | −51.31113 | DD[17] | | | |
| 18 | ∞ | 1.000 | 1.51680 | 64.20 | 0.53430 |
| 19 | ∞ | 6.857 | | | |

TABLE 21

Example 8

| | INFINITE DISTANCE | 100 mm |
|---|---|---|
| f | 16.133 | 15.789 |
| FNo. | 1.84 | 1.96 |
| 2ω(°) | 39.4 | 38.4 |
| DD[7] | 8.500 | 6.091 |
| DD[17] | 5.000 | 7.409 |

Example 9

Figure 9:
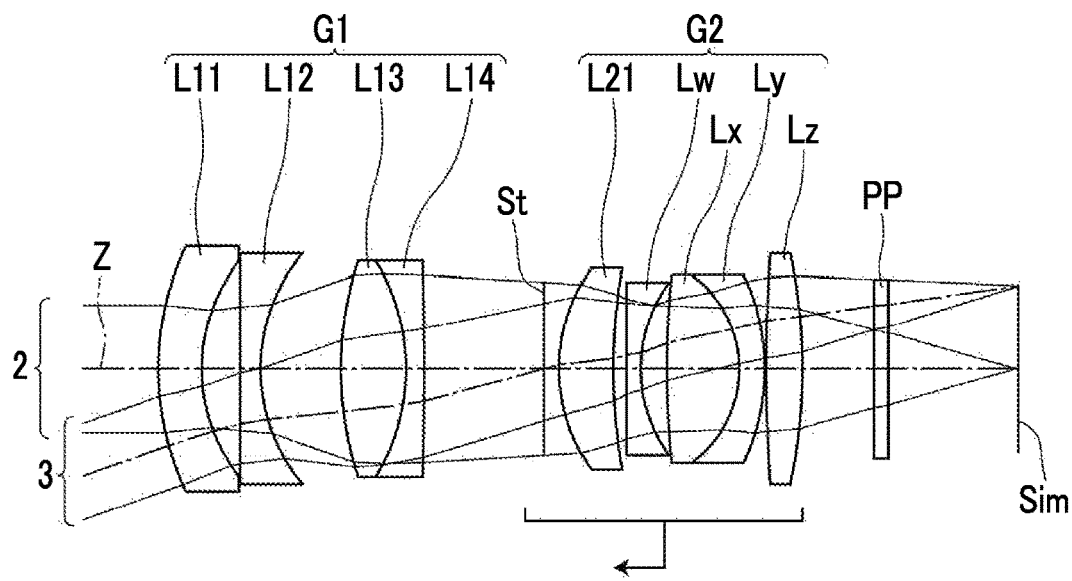
FIG. 9 is a cross-sectional view illustrating a configuration and an optical path of an imaging lens of Example 9 of the present invention.
Figure 19:
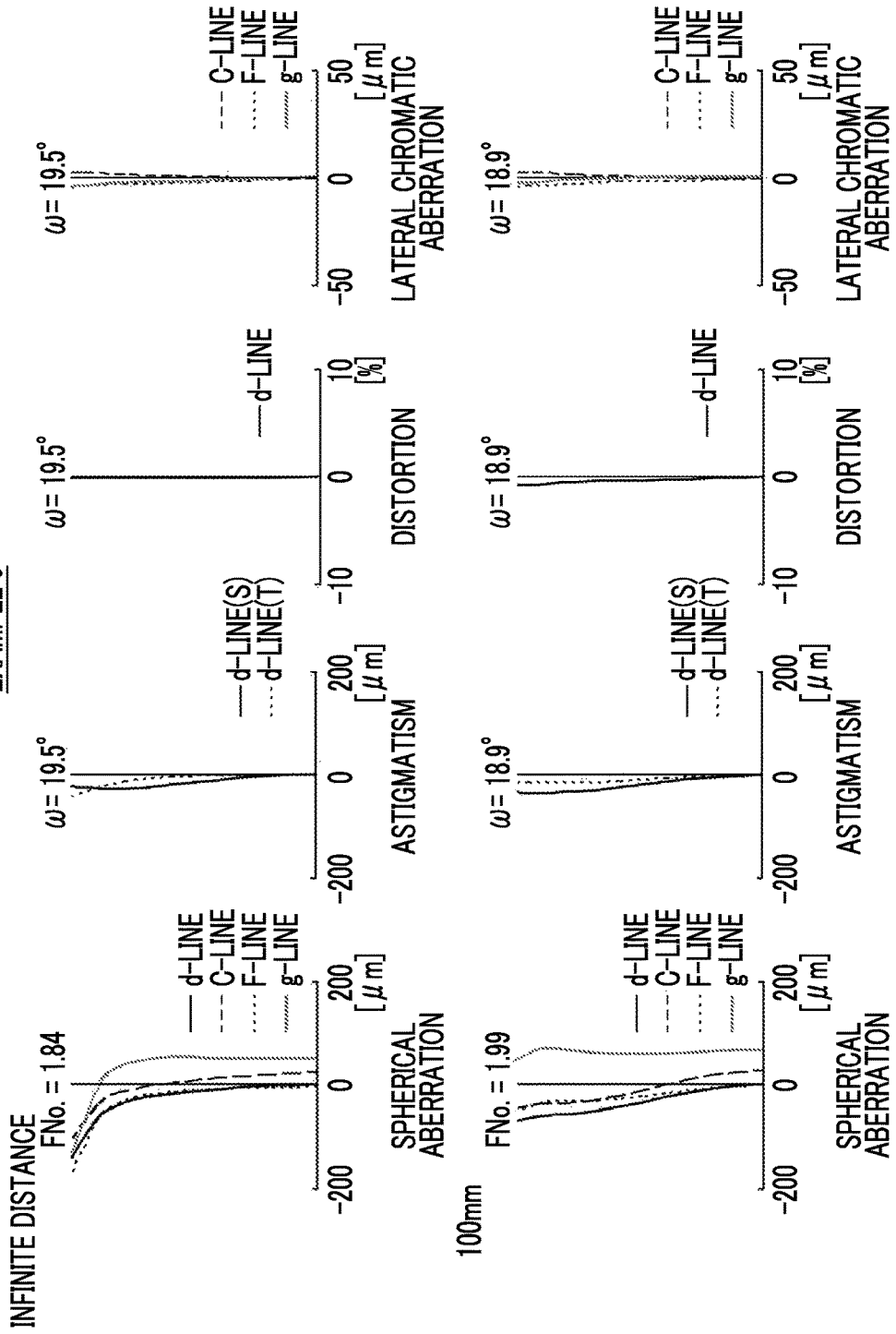
FIG. 19 is a diagram of aberrations of the imaging lens of Example 9 of the present invention, where the diagram includes spherical aberration diagram, astigmatism diagram, distortion diagram, and lateral chromatic aberration diagram, in order from the left side thereof.

FIG. 9 shows a lens configuration of the imaging lens of Example 9. The imaging lens of Example 9 includes, in order from the object side: the first lens group G1 that has a positive refractive power; the aperture diaphragm St; and the second lens group G2 that has a positive refractive power. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. Table 22 shows basic lens data of the imaging lens of Example 9, Table 23 shows specification and variable surface spacings, and FIG. 19 shows aberration diagrams thereof.

TABLE 22

Example 9

| Si | Ri | Di | Ndj | vdj | θgFj |
|---|---|---|---|---|---|
| 1 | 19.97009 | 3.000 | 1.85896 | 22.73 | 0.62844 |
| 2 | 12.06472 | 2.700 | | | |
| 3 | ∞ | 1.400 | 1.51680 | 64.20 | 0.53430 |
| 4 | 12.44048 | 5.563 | | | |
| 5 | 24.28282 | 4.500 | 1.80400 | 46.58 | 0.55730 |
| 6 | −14.45947 | 1.260 | 1.51742 | 52.43 | 0.55649 |
| 7 | −308.55780 | DD[7] | | | |
| 8(St) | ∞ | 1.032 | | | |
| 9 | 12.14036 | 3.700 | 1.95375 | 32.32 | 0.59015 |
| 10 | 40.09335 | 0.900 | | | |
| 11 | ∞ | 1.000 | 1.87614 | 21.19 | 0.62645 |
| 12 | 10.15102 | 1.800 | | | |
| 13 | 62.95120 | 5.010 | 1.59522 | 67.73 | 0.54426 |
| 14 | −8.10000 | 1.763 | 2.00069 | 25.46 | 0.61364 |
| 15 | −15.21517 | 0.100 | | | |
| 16 | 115.19402 | 2.500 | 2.00100 | 29.13 | 0.59952 |
| 17 | −38.51715 | DD[17] | | | |
| 18 | ∞ | 1.000 | 1.51680 | 64.20 | 0.53430 |
| 19 | ∞ | 9.040 | | | |

TABLE 23

| | INFINITE DISTANCE | 100 mm |
|---|---|---|
| f | 16.251 | 15.963 |
| FNo. | 1.84 | 1.99 |
| 2ω(°) | 39.0 | 37.8 |
| DD[7] | 8.331 | 5.891 |
| DD[17] | 5.000 | 7.440 |

Example 10

Figure 10:
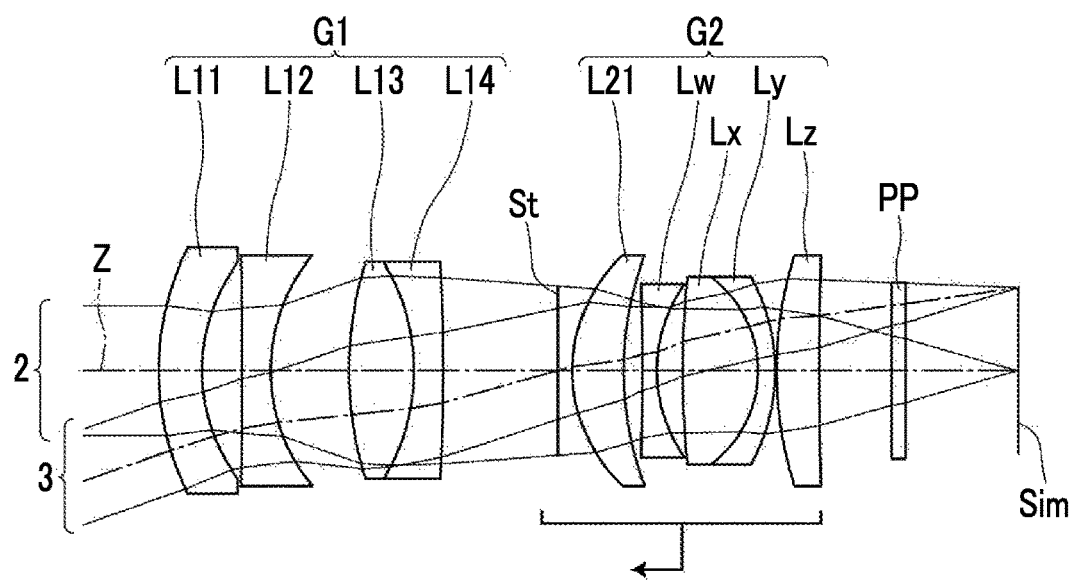
FIG. 10 is a cross-sectional view illustrating a configuration and an optical path of an imaging lens of Example 10 of the present invention.
Figure 20:
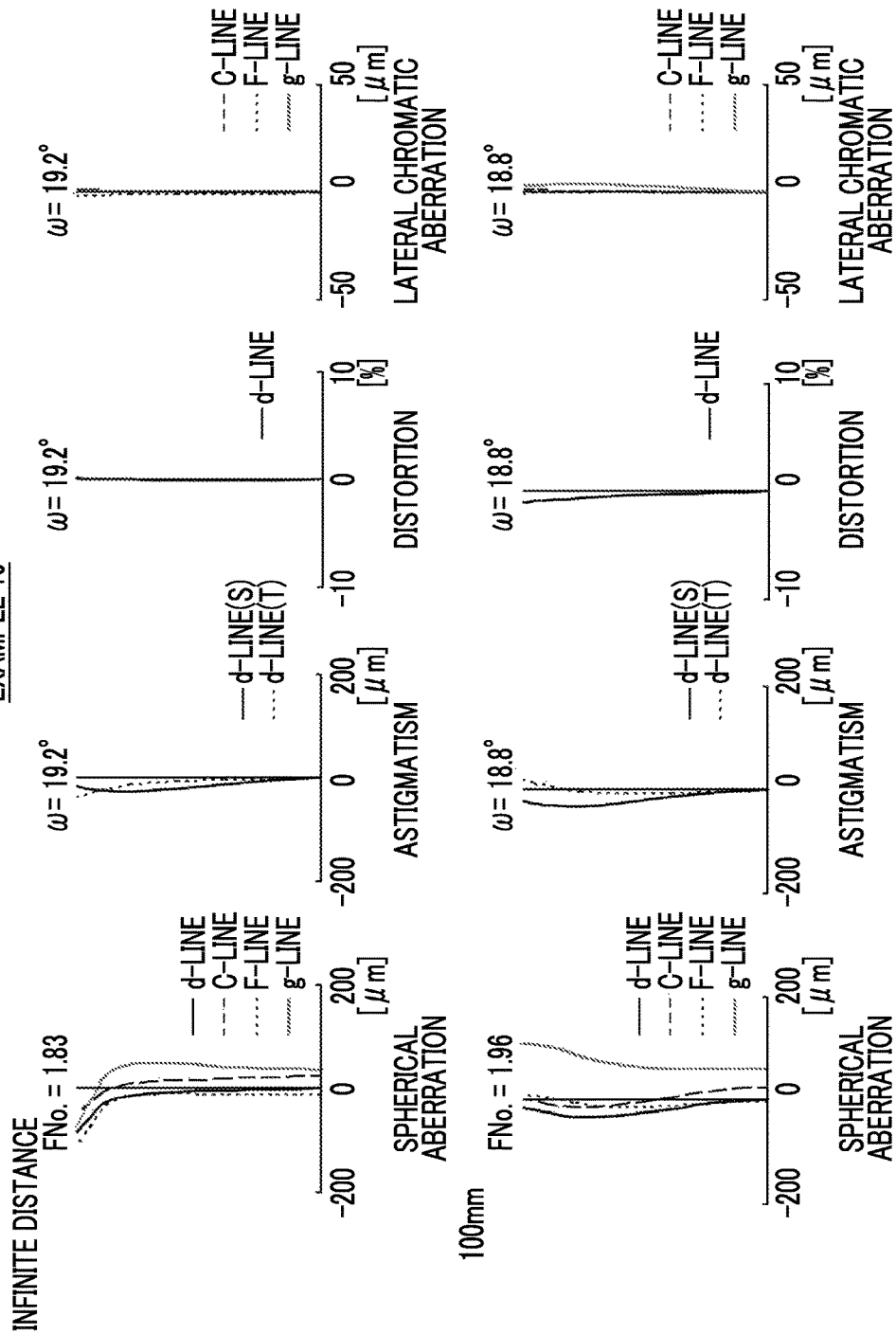
FIG. 20 is a diagram of aberrations of the imaging lens of Example 10 of the present invention, where the diagram includes spherical aberration diagram, astigmatism diagram, distortion diagram, and lateral chromatic aberration diagram, in order from the left side thereof.

FIG. 10 shows a lens configuration of the imaging lens of Example 10. The imaging lens of Example 10 includes, in order from the object side: the first lens group G1 that has a positive refractive power; the aperture diaphragm St; and the second lens group G2 that has a positive refractive power. The first lens group G1 includes, in order from the object side, the four lenses L11 to L14, and the second lens group G2 includes, in order from the object side, five lenses including the lens L21, the W lens Lw, the X lens Lx, the Y lens Ly, and the Z lens Lz. Table 24 shows basic lens data of the imaging lens of Example 10, Table 25 shows specification and variable surface spacings, and FIG. 20 shows aberration diagrams thereof.

TABLE 24

Example 10

| Si | Ri | Di | Ndj | vdj | θgFj |
|---|---|---|---|---|---|
| 1 | 19.00636 | 3.000 | 2.00272 | 19.32 | 0.64514 |
| 2 | 12.49794 | 2.800 | | | |
| 3 | −751.82818 | 2.000 | 1.51680 | 64.20 | 0.53430 |
| 4 | 12.48453 | 5.428 | | | |
| 5 | 25.26094 | 4.500 | 1.81600 | 46.62 | 0.55682 |
| 6 | −14.46937 | 2.010 | 1.51742 | 52.43 | 0.55649 |
| 7 | −141.14259 | DD[7] | | | |
| 8(St) | ∞ | 1.000 | | | |
| 9 | 10.99825 | 3.500 | 1.80420 | 46.50 | 0.55799 |
| 10 | 22.37588 | 1.300 | | | |
| 11 | −218.98080 | 1.000 | 1.72825 | 28.32 | 0.60590 |
| 12 | 10.27456 | 1.800 | | | |
| 13 | 62.95120 | 5.210 | 1.59522 | 67.73 | 0.54426 |
| 14 | −8.10000 | 1.200 | 2.00069 | 25.46 | 0.61364 |
| 15 | −13.28640 | 0.100 | | | |

TABLE 24-continued

Example 10

| Si | Ri | Di | Ndj | vdj | θgFj |
|----|----|----|-----|-----|------|
| 16 | 26.60961 | 3.000 | 1.88100 | 40.14 | 0.57010 |
| 17 | 281.33610 | DD[17] | | | |
| 18 | ∞ | 1.000 | 1.51680 | 64.20 | 0.53430 |
| 19 | ∞ | 7.853 | | | |

TABLE 25

Example 10

| | INFINITE DISTANCE | 100 mm |
|---|---|---|
| f | 16.463 | 16.070 |
| FNo. | 1.83 | 1.96 |
| 2ω(°) | 38.4 | 37.6 |
| DD[7] | 8.000 | 5.479 |
| DD[17] | 5.000 | 7.521 |

Table 26 shows the focal length f1 of the first lens group G1, the focal length f2 of the second lens group G2, and values corresponding to the conditional expression (1) to (9), for the imaging lenses of Examples 1 to 10. The values shown in Table 26 are based on the d-line.

TABLE 26

| EXPRESSION NUMBER | CONDITIONAL EXPRESSION | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|
| | f1 | −34.231 | −835.911 | 1528.979 | 597.977 | −84.602 | 79.738 | 72.148 | 73.278 | 91.495 | 70.328 |
| | f2 | 17.020 | 18.687 | 20.164 | 20.352 | 17.453 | 24.486 | 24.402 | 24.381 | 23.968 | 24.166 |
| (1) | (RXf − RWr)/(RXf + RWr) | 0.392 | 1.000 | 1.000 | 1.302 | 1.000 | 1.000 | 0.962 | 0.959 | 0.722 | 0.719 |
| (2) | dWX/f2 | 0.064 | 0.079 | 0.050 | 0.067 | 0.060 | 0.080 | 0.073 | 0.080 | 0.075 | 0.074 |
| (3) | vZ − vY | 14.87 | 20.50 | 9.47 | 8.51 | 26.03 | 6.86 | 6.86 | 6.86 | 3.68 | 14.68 |
| (4) | f2/RWr | 1.987 | 1.446 | 1.291 | 1.551 | 1.391 | 2.627 | 2.639 | 2.626 | 2.361 | 2.352 |
| (5) | f2/RYf | −2.050 | −2.189 | −2.244 | −2.432 | −2.817 | −3.023 | −2.977 | −3.029 | −2.959 | −2.983 |
| (6) | f/f2 | 0.482 | 0.643 | 0.610 | 0.605 | 0.688 | 0.671 | 0.657 | 0.662 | 0.678 | 0.681 |
| (7) | f2/f1 | −0.497 | −0.022 | 0.013 | 0.034 | −0.206 | 0.307 | 0.338 | 0.333 | 0.262 | 0.344 |
| (8) | RWr/RYf | −1.032 | −0.514 | −1.739 | −1.567 | −2.025 | −1.151 | −1.128 | −1.153 | −1.253 | −1.268 |
| (9) | f2/f21 | 0.871 | 0.830 | 0.901 | 1.003 | 1.376 | 1.397 | 1.508 | 1.486 | 1.398 | 1.022 |

As can be seen from the above-mentioned data, the imaging lenses of Examples 1 to 10 each have a small F number which is within a range of 1.80 to 2.0 in a state where the infinite distance object is in focus, and have small fluctuation in aberrations caused by focusing, and each aberration is satisfactorily corrected, thereby achieving high optical performance.

Figure 21:
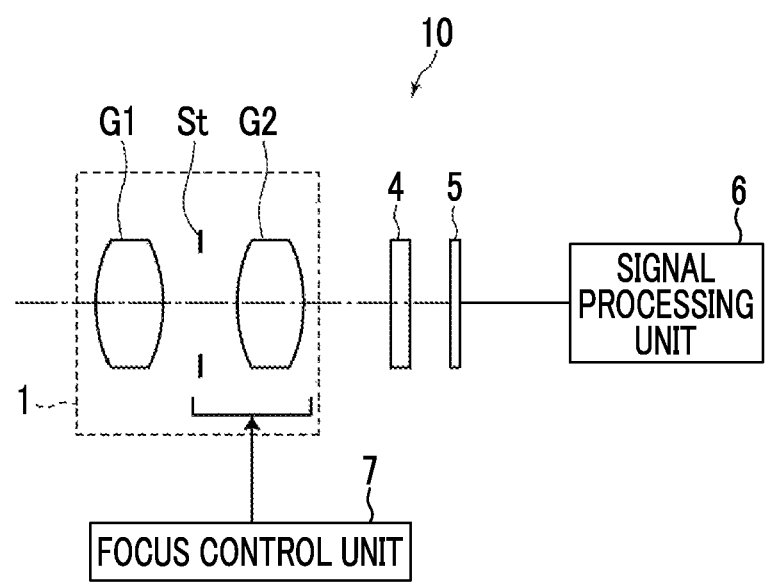
FIG. 21 is a schematic configuration diagram of an imaging apparatus according to an embodiment of the present invention.

Next, an imaging apparatus according to embodiment of the present invention will be described. FIG. 21 is a schematic configuration diagram of an imaging apparatus 10 using the imaging lens 1 according to the embodiment of the present invention as an example of an imaging apparatus of an embodiment of the present invention. As the imaging apparatus 10, for example, there is an FA camera, a machine vision camera, or a surveillance camera.

The imaging apparatus 10 comprises: the imaging lens 1; a filter 4 that is disposed on the image side of the imaging lens 1; an imaging element 5; a signal processing unit 6 that performs processing of calculating a signal which is output from the imaging element 5, and a focus control unit 7 that is for performing focusing of the imaging lens 1. FIG. 21 schematically shows the first lens group G1, the aperture diaphragm St, and the second lens group G2 which are belonging to the imaging lens 1. In addition, FIG. 21 shows an example in which focusing is performed by integrally moving the second lens group G2 and the aperture diaphragm St through the focus control unit 7, but a focusing method of the imaging apparatus of the present invention is not limited to this example. The imaging element 5 captures an image of a subject, which is formed through the imaging lens 1, and converts the image into an electrical signal. For example, charge coupled device (CCD), complementary metal oxide semiconductor (CMOS), or the like may be used. The imaging element 5 is disposed such that the imaging surface thereof is coplanar with the image plane of the imaging lens 1. The imaging apparatus 10 of the present embodiment comprises the imaging lens 1. Thus, it is possible to appropriately cope with a change in object distance, and it is possible to acquire a favorable image.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric coefficient of each lens component are not limited to the values shown in the numerical examples, and different values may be used therefor.

For example, in each example, the lens system, which performs focusing from the infinite distance object to the close-range object, is used. However, it is needless to say that the present invention can be applied to an imaging lens which performs focusing from a long distance object at a finite distance to a close-range object.

The imaging apparatus according to the embodiment of the present invention is also not limited to the above-mentioned examples, but may include various embodiments such as a video camera, a digital camera, a film camera, and a cinema camera.

EXPLANATION OF REFERENCES

1: imaging lens
2: on-axis rays
3: off-axis rays with maximum angle of view
4: filter
5: imaging element
6: signal processing unit
7: focus control unit
10: imaging apparatus
G1: first lens group
G2: second lens group
L11 to L14, L21, La, Lb: lens
Lab: cemented lens
Lw: W lens
Lx: X lens Ly: Y lens
Lz: Z lens
PP: optical member
Sim: image plane
St: aperture diaphragm
Z: optical axis

What is claimed is:

1. An imaging lens consisting of, in order from an object side:
   a first lens group that remains stationary with respect to an image plane during focusing;
   a diaphragm; and
   a second lens group that moves from an image side to the object side during focusing from a long distance object to a close-range object and has a positive refractive power as a whole,
   wherein the second lens group includes a Z lens that is a positive lens formed continuously in order from a most image side, a Y lens that is a negative lens having an absolute value of a radius of curvature of an object side surface smaller than an absolute value of a radius of curvature of an image side surface, an X lens that is a positive lens, and a W lens that is a negative lens having an absolute value of a radius of curvature of an image side surface smaller than an absolute value of a radius of curvature of an object side surface,
   wherein when the second lens group moves, at least the Z lens, the Y lens, the X lens, and the W lens move,
   wherein the following conditional expression (1) is satisfied, $$0.1 < (RXf - RWr)/(RXf + RWr) < 3 \tag{1},$$

where RXf is a radius of curvature of an object side surface of the X lens, and
   RWr is the radius of curvature of the image side surface of the W lens, and
   wherein the following conditional expression (7) is satisfied, $$-0.55 < f2/f1 < 0.5 \tag{7},$$

where f2 is a focal length of the second lens group, and
   f1 is a focal length of the first lens group.

2. The imaging lens according to claim 1, wherein the following conditional expression (2) is satisfied, $$0.01 < dWX/f2 < 0.2 \tag{2},$$

where dWX is an on-axis spacing between the image side surface of the W lens and the object side surface of the X lens, and
   f2 is a focal length of the second lens group.

3. The imaging lens according to claim 1, wherein the following conditional expression (3) is satisfied, $$2.5 < vZ - vY < 40 \tag{3},$$

where vZ is an Abbe number of the Z lens based on a d-line, and
   vY is an Abbe number of the Y lens based on a d-line.

4. The imaging lens according to claim 1, wherein the following conditional expression (4) is satisfied, $$0.5 < f2/RWr < 4 \tag{4},$$

where f2 is a focal length of the second lens group.

5. The imaging lens according to claim 1, wherein the following conditional expression (5) is satisfied, $$-4 < f2/RYf < -1 \tag{5},$$

where f2 is a focal length of the second lens group, and
   RYf is the radius of curvature of the object side surface of the Y lens.

6. The imaging lens according to claim 1, wherein the following conditional expression (6) is satisfied, $$0.4 < f/f2 < 1 \tag{6},$$

where f is a focal length of a whole system in a state where an infinite distance object is in focus, and
   f2 is a focal length of the second lens group.

7. The imaging lens according to claim 1, wherein the following conditional expression (1-1) is satisfied.

$$0.2 < (RXf - RWr)/(RXf + RWr) < 1.8 \tag{1-1}.$$

8. The imaging lens according to claim 1, wherein the following conditional expression (2-1) is satisfied, $$0.03 < dWX/f2 < 0.15 \tag{2-1},$$

where dWX is an on-axis spacing between the image side surface of the W lens and the object side surface of the X lens, and
   f2 is a focal length of the second lens group.

9. The imaging lens according to claim 1, wherein the following conditional expression (3-1) is satisfied, $$3 < vZ - vY < 35 \tag{3-1},$$

where vZ is an Abbe number of the Z lens based on a d-line, and
   vY is an Abbe number of the Y lens based on a d-line.

10. The imaging lens according to claim 1, wherein the following conditional expression (4-1) is satisfied, $$0.8 < f2/RWr < 3 \tag{4-1},$$

where f2 is a focal length of the second lens group.

11. The imaging lens according to claim 1, wherein the following conditional expression (5-1) is satisfied, $$-3.5 < f2/RYf < -1.5 \tag{5-1},$$

where f2 is a focal length of the second lens group, and
   RYf is the radius of curvature of the object side surface of the Y lens.

12. The imaging lens according to claim 1, wherein the following conditional expression (6-1) is satisfied, $$0.45 < f/f2 < 0.8 \tag{6-1},$$

where f is a focal length of the whole system, and
   f2 is a focal length of the second lens group.

13. The imaging lens according to claim 1, wherein the second lens group consists of, in order from the object side, a lens component that has a positive refractive power, the W lens, the X lens, the Y lens, and the Z lens.

14. The imaging lens according to claim 1, wherein the first lens group consists of four lenses that include at least two negative lenses.

15. The imaging lens according to claim 1, wherein the first lens group consists of, in order from the object side, a negative lens, a negative lens, a positive lens, and a negative lens.

16. The imaging lens according to claim 1, wherein the following conditional expression (8) is satisfied, $$-3 < RWr/RYf < -0.5 \tag{8},$$

where RYf is the radius of curvature of the object side surface of the Y lens.

17. The imaging lens according to claim 13, wherein the following conditional expression (9) is satisfied, $$0.75 < f2/f21 < 2 \tag{9},$$

where f2 is a focal length of the second lens group, and f21 is a focal length of the lens component having the positive refractive power in the second lens group.

18. An imaging apparatus comprising the imaging lens according to claim 1.

19. An imaging lens consisting of, in order from an object side:
   a first lens group that remains stationary with respect to an image plane during focusing;
   a diaphragm; and
   a second lens group that moves from an image side to the object side during focusing from a long distance object to a close-range object and has a positive refractive power as a whole,
   wherein the second lens group includes a Z lens that is a positive lens formed continuously in order from a most image side, a Y lens that is a negative lens having an absolute value of a radius of curvature of an object side surface smaller than an absolute value of a radius of curvature of an image side surface, an X lens that is a positive lens, and a W lens that is a negative lens having an absolute value of a radius of curvature of an image side surface smaller than an absolute value of a radius of curvature of an object side surface,
   wherein when the second lens group moves, at least the Z lens, the Y lens, the X lens, and the W lens move,
   wherein the following conditional expression (1) is satisfied, $$0.1 < (RXf - RWr)/(RXf + RWr) < 3 \tag{1},$$

where RXf is a radius of curvature of an object side surface of the X lens, and
RWr is the radius of curvature of the image side surface of the W lens, and
   wherein the following conditional expression (7-1) is satisfied, $$-0.5 < f2/f1 < 0.4 \tag{7-1},$$

where f2 is a focal length of the second lens group, and f1 is a focal length of the first lens group.

* * * * *